United States Patent
Kato

(10) Patent No.: US 7,414,760 B2
(45) Date of Patent: Aug. 19, 2008

(54) IMAGE READER, IMAGE READING APPARATUS, AND READING RESOLUTION SETTING METHOD

(75) Inventor: Tetsuya Kato, Chiryu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1033 days.

(21) Appl. No.: 10/827,316

(22) Filed: Apr. 20, 2004

(65) Prior Publication Data

US 2004/0212844 A1    Oct. 28, 2004

(30) Foreign Application Priority Data

Apr. 24, 2003    (JP) .............................. 2003-120313

(51) Int. Cl.
*H04N 1/04*    (2006.01)

(52) U.S. Cl. ...................... 358/474; 358/513; 358/514; 358/501; 358/505; 358/530; 382/274; 348/311; 348/294

(58) Field of Classification Search ................. 358/358, 358/1.2, 501, 505, 509, 513, 530, 408, 409, 358/410, 411, 465, 468, 474, 514; 348/311, 348/294; 382/274
See application file for complete search history.

(56) References Cited

U.S. PATENT DOCUMENTS

| | | | |
|---|---|---|---|
| 5,420,693 A | | 5/1995 | Horiuchi et al. |
| 5,936,742 A | | 8/1999 | Horiuchi et al. |
| 5,940,192 A | * | 8/1999 | Ichikawa et al. ............ 358/530 |
| 6,473,538 B2 | | 10/2002 | Kozuka |
| 2002/0135827 A1 | * | 9/2002 | Saika .......................... 358/513 |

FOREIGN PATENT DOCUMENTS

| JP | A 62-194775 | 8/1987 |
|---|---|---|
| JP | A 4-4682 | 1/1992 |
| JP | A 4-304779 | 10/1992 |
| JP | A 4-369962 | 12/1992 |
| JP | A 5-227362 | 9/1993 |
| JP | A 11-234473 | 8/1999 |
| JP | A 2000-101803 | 4/2000 |
| JP | A 2002-185698 | 6/2002 |

* cited by examiner

*Primary Examiner*—Edward L Coles, Sr.
*Assistant Examiner*—Negussie Worku
(74) *Attorney, Agent, or Firm*—Oliff & Berridge, PLC

(57) ABSTRACT

An image reader including photoelectric transducers each of which converts a light signal into an electric signal, and outputs the signal to a signal line, channel selecting switches each of which selectively connects, and disconnects, a corresponding one of the transducers to, and from, the signal line, and a resolution selecting portion which receives a control-start signal which commands the image reader to start controlling the switches, and continues to take a predetermined voltage in a first predetermined time duration, and each one of clock-pulse signals which have respective different numbers of characteristic portions or portion in a second predetermined time duration falling in the first time duration, and each of which has pulses in a third time duration following the second time duration, the switches being sequentially controlled in synchronism with the pulses of the each clock-pulse signal, so as to sequentially connect, and disconnect, the corresponding transducers to, and from, the signal line, the resolution selecting portion selecting, based on the number of characteristic portions of the each clock-pulse signal, a corresponding one of different reading resolutions corresponding to different control patterns, respectively, so that the switches are sequentially controlled according to the control pattern corresponding to the selected reading resolution, in synchronism with the pulses of the each clock-pulse signal.

24 Claims, 13 Drawing Sheets

IMAGE READER, IMAGE READING APPARATUS, AND READING RESOLUTION SETTING METHOD

BACKGROUND OF THE INVENTION

1. Field of the Invention

The present invention relates to an image reader, an image reading apparatus, and a reading resolution setting method, and particularly to the art of changing a reading resolution of the image reader that may be employed by the image reading apparatus and may be used in the reading resolution setting method.

2. Discussion of Related Art

There has conventionally been known an image reading apparatus, employed by, e.g., a facsimile machine or a copying machine, that includes a contact image reader (CIS) that reads an image according to a start signal and a clock pulse signal.

In addition, there has been proposed such an image reading apparatus that can change a reading resolution of an image reader thereof that is to be used to read an image. However, the image reading apparatus suffers a problem that an exclusive signal line is needed to indicate the reading resolution to the image reader, which leads to increasing the production cost of the apparatus.

In this background, Japanese Patent Publication No. 2000-101803 discloses an image reading apparatus that can change, according to a reading resolution to be indicated to an image reader thereof, a pulse width of a start signal, and thereby change a number of pulses of a clock pulse signal that occur while the start signal takes an ON state (i.e., a high level), so that the reading resolution is indicated to the image reader without using an exclusive signal line.

However, the above-indicated image reading apparatus suffers a problem that the start signal needs to take the ON state for an increased time duration, for the purpose of changing the number of pulses of the clock signal according to the reading resolution and accordingly the image reader cannot commence an image reading operation for the increased time duration.

SUMMARY OF THE INVENTION

It is therefore an object of the present invention to provide an image reader, an image reading apparatus, and a reading resolution setting method each of which can prevent a problem that commencement of reading of an image may be delayed.

According to a first aspect of the present invention, there is provided an image reader comprising a plurality of photoelectric transducers each of which converts a light signal received from an image, into an electric signal, and includes an output portion which outputs the electric signal to a signal line common to the photoelectric transducers; a plurality of channel selecting switches each of which is connected to a corresponding one of the photoelectric transducers and selectively connects, and disconnects, the output portion of the one photoelectric transducer to, and from, the signal line; and a resolution selecting portion which receives, from an external device, a control-start signal which commands the image reader to start controlling the channel selecting switches, and continues to take a predetermined voltage in a first predetermined time duration, and each one of a plurality of clock-pulse signals which have respective different numbers of characteristic portions or portion in a second predetermined time duration falling in the first time duration, and the each of which has a plurality of pulses in a third time duration following the second time duration, the channel selecting switches being sequentially controlled in synchronism with the pulses of the each clock-pulse signal in the third time duration, so as to sequentially connect, and disconnect, the respective output portions of the corresponding photoelectric transducers to, and from, the signal line, the resolution selecting portion selecting, based on the number of characteristic portions or portion of the each clock-pulse signal, a corresponding one of a plurality of different reading resolutions corresponding to a plurality of different control patterns, respectively, so that the channel selecting switches are sequentially controlled according to the control pattern corresponding to the selected reading resolution, in synchronism with the pulses of the each clock-pulse signal in the third time duration.

According to the first aspect of the invention, the image reader selects each one of the reading resolutions based on the control-start signal and a corresponding one of the clock-pulse signals. Therefore, it is not needed to input an additional signal to the image reader so as to indicate each reading resolution to the same, and accordingly the image reader can be produced at low cost. In particular, though the control-start signal continues to take the predetermined voltage just in the first predetermined time duration, the image reader can select the each reading resolution based on the number of characteristic portions or portion of the corresponding clock-pulse signal that occur or occurs in the second predetermined time duration falling in the first time duration. Thus, the time duration needed before the commencement of reading of the image can be shortened.

According to a preferred feature of the first aspect of the invention, the image reader further comprises a plurality of shift registers which control, according to the control pattern corresponding to the reading resolution selected by the resolution selecting portion, the channel selecting switches, so that the channel selecting switches sequentially connect, and disconnect, the respective output portions of the corresponding photoelectric transducers to, and from, the signal line. According to this feature, the channel selecting switches can be operated with reliability by the shift registers.

According to another feature of the first aspect of the invention, the resolution selecting portion selects the one reading resolution based on a number of pulses or pulse of the each clock-pulse signal that occur or occurs in the second time duration falling in the first time duration in which the control-start signal continues to take the predetermined voltage. According to this feature, each one of the reading resolutions can be easily selected based on the number of pulses or pulse of a corresponding one of the clock-pulse signals. The number of pulses of each clock-pulse signal that occur in the second predetermined time duration falling in the first predetermined time duration in which the control-start signal continues to take the predetermined voltage, may be detected as the number of pulse rises, or pulse falls, of the each clock-pulse signal that occur in the second predetermined time duration.

According to another feature of the first aspect of the invention, each time the image reader reads one of a plurality of lines in the image, the resolution selecting portion selects one of the reading resolutions. According to this feature, the selection of each one of the reading resolutions and the reading of a corresponding one of the lines in the image can be carried out in a series of steps corresponding to the one line. Therefore, the image reading operation of the image reader can be easily controlled.

According to another feature of the first aspect of the invention, the channel selecting switches comprise a plurality of groups of channel selecting switches, and when the resolution selecting portion selects one of the reading resolutions, such that the selected reading resolution is not a highest one of the reading resolutions, the shift registers sequentially control, according to the control pattern corresponding to the selected reading resolution, the groups of channel selecting switches, such that each group of channel selecting switches simultaneously connect, and disconnect, the corresponding photoelectric transducers to, and from, the signal line. According to this feature, even if a reading resolution different from the highest reading resolution may be selected, the electric signals outputted from the photoelectric transducers to the signal line can enjoy their high power. In this case, a conventional image reader operates such that a cycle in which photoelectric transducers receive respective light signals and output respective electric signals shortens, and accordingly the power of the electric signal outputted from each photoelectric transducer to the output signal line decreases. In contrast, in the present image reader, the shift registers control, according to the selected reading resolution, the channel selecting switches, such that each group of channel selecting switches simultaneously connect, and disconnect the respective output portions of the corresponding photoelectric transducers to, and from, the signal line, so that the respective electric signals from those photoelectric transducers are simultaneously outputted to the signal line. For example, in the case where the selected reading resolution is equal to (the highest resolution)/n (n is a natural number greater than one), each group consisting of n channel selecting switches are simultaneously connected to the signal line.

According to another feature of the first aspect of the invention, the image reader further comprises a confirmation-signal producing portion which produces a resolution confirmation signal representing the reading resolution selected by the resolution selecting portion, and outputs the resolution confirmation signal to the signal line. According to this feature, for example, an image reading apparatus employing the present image reader can judge whether each one of the reading resolutions has normally been selected by the image reader. If it is judged that the each reading resolution has not normally been selected by the image reader, the image reading apparatus can command the image reader to stop reading the image, or can display an alarm message. In addition, since the resolution confirmation signal is outputted to the signal line to which the respective electric signals of the photoelectric transducers are outputted, it is not needed to employ exclusive terminals or the like to output the resolution confirmation signal, which leads to decreasing the production cost of the image reader.

According to another feature of the first aspect of the invention, the confirmation-signal producing portion outputs the resolution confirmation signal to the signal line, before the channel selecting switches are controlled, according to the control pattern corresponding to the selected reading resolution, to sequentially connect, and disconnect, the respective output portions of the corresponding photoelectric transducers to, and from, the signal line. According to this feature, for example, the above-described image reading apparatus can quickly receive the resolution confirmation signal and accordingly can quickly command the image reader to stop reading the image. In addition, the image reading apparatus can easily distinguish, and extract, the resolution confirmation signal from the electric signals outputted from the photoelectric transducers.

According to another feature of the first aspect of the invention, in the first time duration in which the control-start signal continues to take the predetermined voltage, the channel selecting switches are not controlled to connect, and disconnect, the respective output portions of the corresponding photoelectric transducers to, and from, the signal line. According to this feature, the image reader can prevent itself from starting reading the image before one reading resolution is selected.

According to a second aspect of the present invention, there is provided an image reading apparatus comprising an image reader according to the first aspect of the invention; a control-start-signal outputting portion which outputs the control-start signal to the image reader; and a clock-pulse-signal outputting portion which selects, based on each one of the reading resolutions that is to be indicated to the image reader, a corresponding one of the clock-pulse signals, and outputs the selected clock-pulse signal to the image reader.

According to the second aspect of the invention, the image reading apparatus utilizes the control-start signal and each one of the clock-pulse signals, for indicating a corresponding one of the reading resolutions to the image reader. Therefore, it is not needed to employ an additional signal line to indicate each reading resolution to the image reader, and accordingly the image reading apparatus can be produced at low cost. In particular, since the present image reading apparatus can indicate each reading resolution to the image reader, by selecting a corresponding one of the clock-pulse signals having the respective different numbers of characteristic portions or portion in the second predetermined time duration falling in the first predetermined time duration in which the control-start signal continues to take the predetermined voltage, the time duration needed by the image reader before the commencement of reading of the image can be shortened.

According to a preferred feature of the second aspect of the invention, the clock-pulse-signal outputting portion selects, based on a first reading resolution of the reading resolutions that is to be indicated to the image reader, a primary clock-pulse signal of the clock-pulse signals that has a first number of characteristic portions or portion in each of the second time duration in which the control-start signal continues to take a first predetermine voltage as the predetermined voltage, and each of a plurality of unit times in the third time duration in which the control-start signal continues to take a second predetermined voltage, a length of the each unit time being equal to a length of the second time duration, and wherein the clock-pulse-signal outputting portion selects, based on a second reading resolution of the reading resolutions that is to be indicated to the image reader, a secondary clock-pulse signal of the clock-pulse signals that has a second number of characteristic portions in the second time duration, and has the first number of characteristic portions or portion in the each unit time in the third time duration. According to this feature, in the case where the total number of the reading resolutions employed is equal to n (n is a natural number greater than one), the total number of the clock-pulse signals having, in the second predetermined time duration, the respective different numbers of characteristic portions than the first number of characteristic portions or portion is equal to (n−1). Therefore, the construction of the present image reading apparatus can be simplified.

According to another feature of the second aspect of the invention, the clock-pulse-signal outputting portion comprises a clock-pulse-signal producing portion which produces the clock-pulse signals having the different numbers of characteristic portions or portion in the second time duration, respectively; and a clock-pulse-signal selecting portion which selects, based on the each reading resolution to be indicated to the image reader, the one clock-pulse signal, and outputs the selected clock-pulse signal to the image reader. According to this feature, the image reading apparatus can easily indicate each reading resolution to the image reader, by selecting a corresponding one of the different clock-pulse signals that has a corresponding one of the different numbers of characteristic portions.

According to another feature of the second aspect of the invention, the clock-pulse-signal producing portion produces each one of the clock-pulse signals by dividing a frequency of a reference pulse signal by an integral number. According to this feature, the image reading apparatus can easily produce the different sorts of clock-pulse signals.

According to a third aspect of the present invention, there is provided a method of setting a reading resolution in an image reader including a plurality of photoelectric transducers each of which converts a light signal received from an image, into an electric signal, and includes an output portion which outputs the electric signal to a signal line common to the photoelectric transducers, and a plurality of channel selecting switches each of which is connected to a corresponding one of the photoelectric transducers and selectively connects, and disconnects, the output portion of a corresponding one of the photoelectric transducers to, and from, the signal line, the method comprising the steps of receiving, from an external device, a control-start signal which commands the image reader to start controlling the channel selecting switches, and continues to take a predetermined voltage in a first predetermined time duration, and each one of a plurality of clock-pulse signals which have respective different numbers of characteristic portions or portion in a second predetermined time duration falling in the first time duration, and the each of which has a plurality of pulses in a third time duration following the second time duration, the channel selecting switches being sequentially controlled in synchronism with the pulses of the each clock-pulse signal in the third time duration, so as to sequentially connect, and disconnect, the respective output portions of the corresponding photoelectric transducers to, and from, the signal line, and selecting, based on the number of characteristic portions or portion of the each clock-pulse signal, a corresponding one of a plurality of different reading resolutions corresponding to a plurality of different control patterns, respectively, so that the channel selecting switches are sequentially controlled according to the control pattern corresponding to the selected reading resolution, in synchronism with the pulses of the each clock-pulse signal in the third time duration. The reading resolution setting method according to the third aspect of the invention can enjoy the same advantages as those of the image reader according to the first aspect of the invention.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Figure 1:
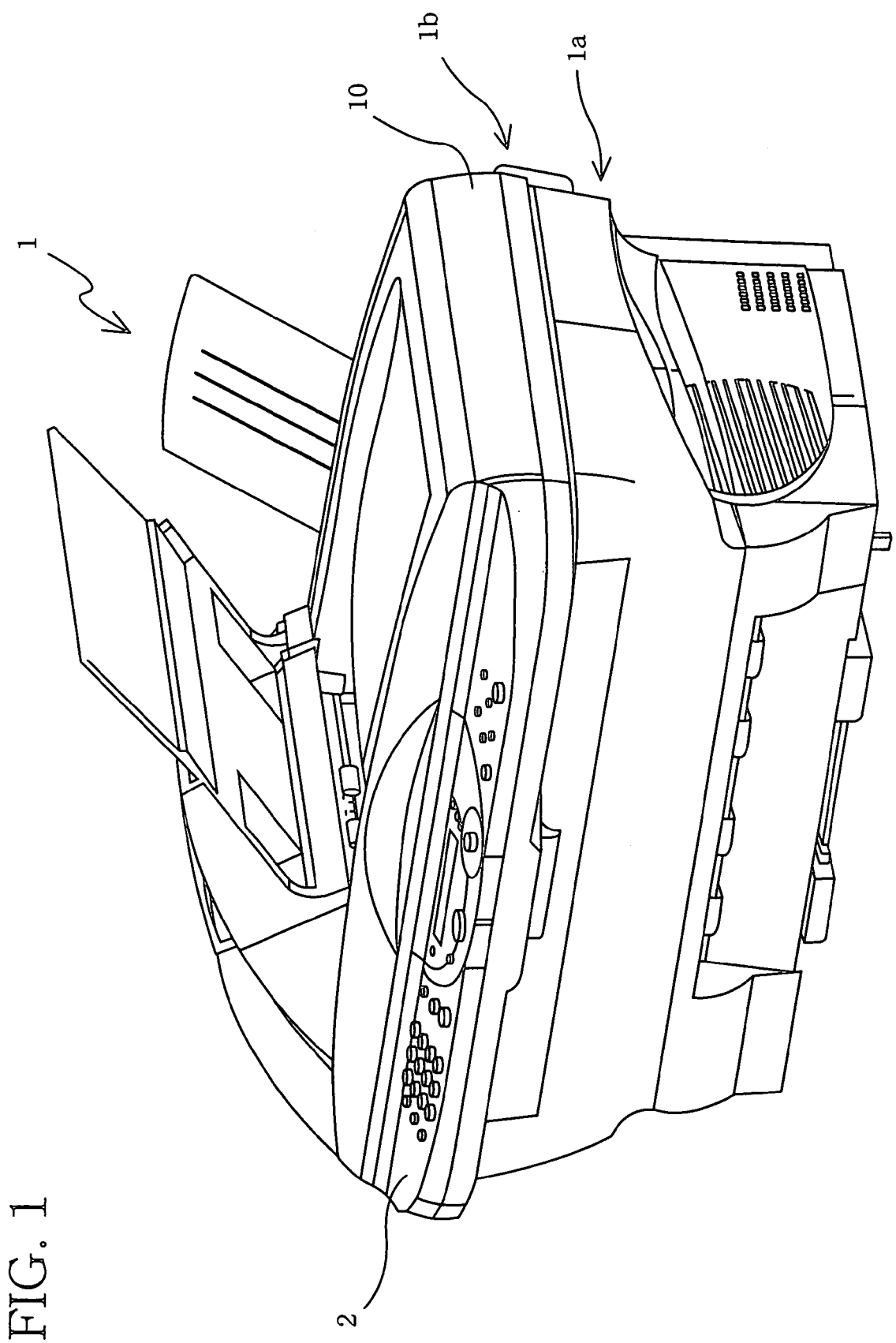
FIG. 1 is a view of a complex machine that incorporates an image recording apparatus to which the present invention is applied.
Figure 2:
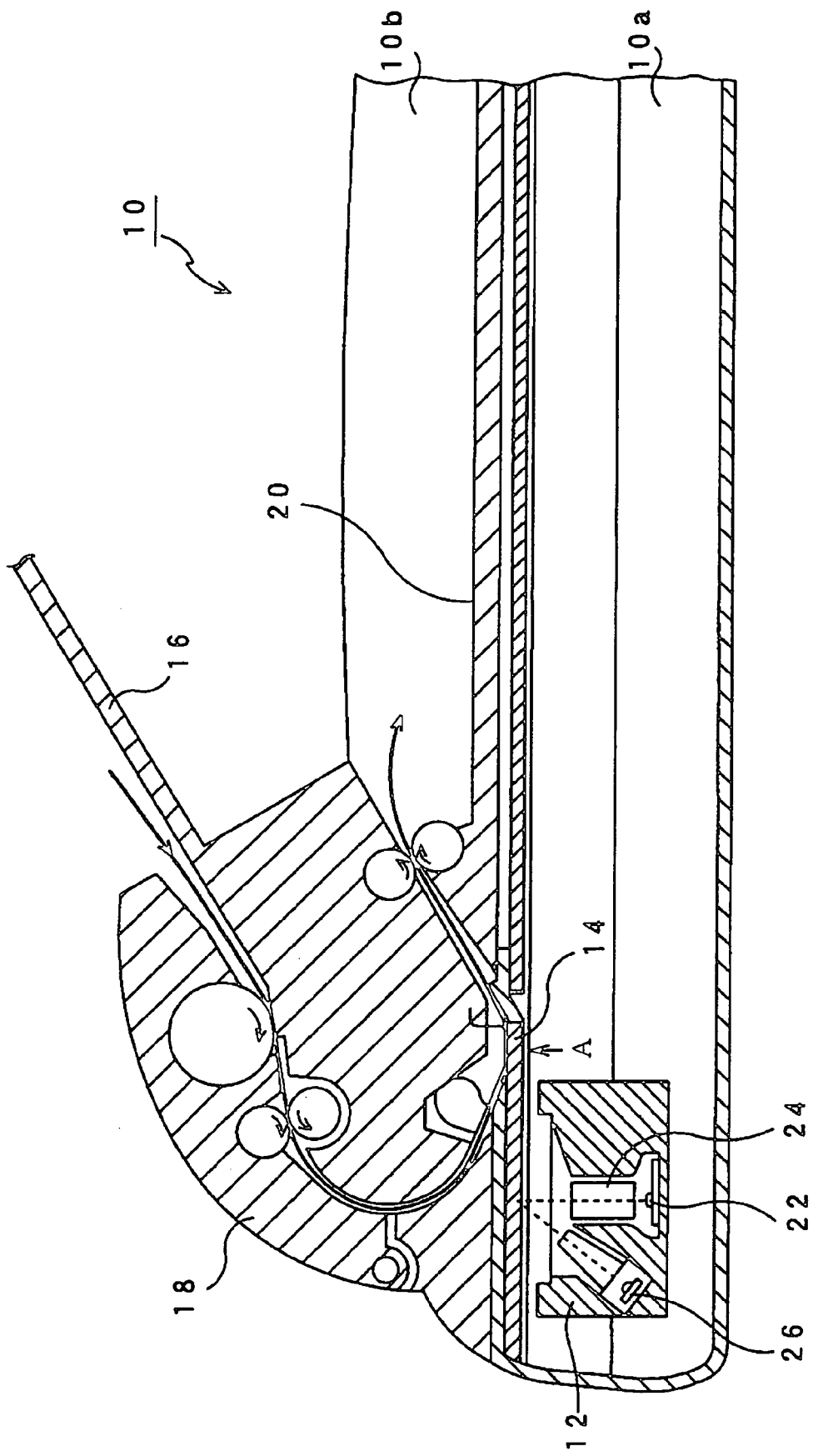
FIG. 2 is a cross-section view of the image reading apparatus.

Hereinafter, there will be described a preferred embodiment of the present invention by reference to the drawings. FIGS. 1 and 2 show a complex machine 1 incorporating an image reading apparatus 10 to which the present invention is applied.

As shown in FIG. 1, the complex machine 1 has a clam-shell structure including a lower case 1a and an upper case 1b that is attached to the lower case 1a such that the upper case 1b can be opened and closed relative to the lower case 1a. The image reading apparatus 10 is incorporated in the upper case 1b. An operation panel 2 is provided in a front-side surface of the upper case 1b. Though the complex machine 1 employs an image recording apparatus (i.e., a laser printer, not shown) in addition to the image reading apparatus 10, the image recording apparatus is not described here because it is not relevant to the present invention.

As shown in FIG. 2, the image reading apparatus 10 employs a flat bed (FB) and an automatic document feed (ADF), and has a clam-shell structure including a flat-bed portion 10a and a cover portion 10b that is attached to the flat-bed portion 10a such that the cover portion 10b can be opened and closed relative to the flat-bed portion 10a.

In the flat-bed portion 10a, there are provided a close-contact-type image sensor or reader (i.e., a reading head) 12 and a platen glass 14; and in the cover portion 10b, there are provided a document supply tray 16, a document feeding device 18, and a document discharge tray 20.

The image reader 12 includes light receiving portions (i.e., photoelectric transducers) 22, a SELFOC lens 24, and a light source 26. The light source 26 emits a light toward an image on a document present at a reading position, R, (FIG. 2), and the lens 24 converges the light reflected from the document and thereby forms the image on the light receiving portions 22. Thus, the image reader 12 reads the image on the document.

The image reader 12 is moved by a drive device, not shown, in a horizontal direction as seen in FIG. 2. When the image reader 12 reads the image on the document, the image reader 12 is moved to a position where the light receiving portions 22 thereof are located at the reading position R.

Figure 3:
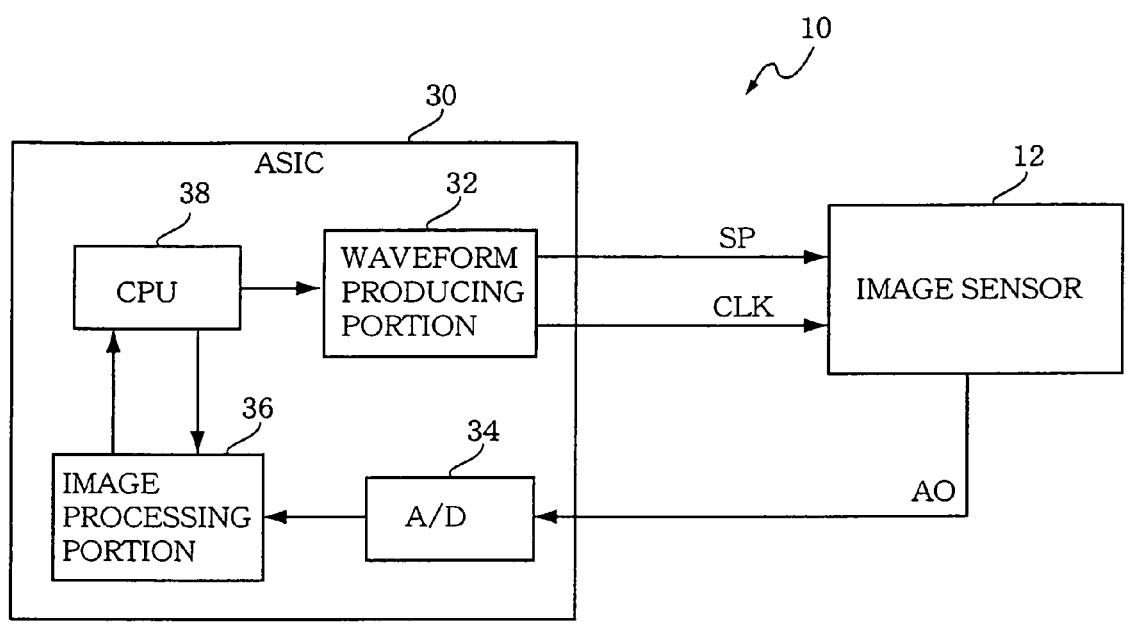
FIG. 3 is a diagrammatic view of an electrical arrangement of the image reading apparatus.

Next, there will be described an electric arrangement of the image reading apparatus 10 by reference to FIG. 3. As shown in the figure, the image reading apparatus 10 includes the image reader 12 and an ASIC (application specific integrated circuit) 30. The image reader 12 reads, based on a start signal (hereinafter, referred to as the "SP" signal), an image in synchronism with a clock pulse signal (hereinafter, referred to as the "CLK" signal), and outputs, as an output signal "AO", an image signal representing the read image. The ASIC 30 outputs the SP signal and the CLK signal to the image reader 12, receives the output signal AO from the reader 12, and processes the output signal AO, i.e., the image represented by the image signal included in the output signal AO.

Here, first, an arrangement of the ASIC 30 is explained. The ASIC 30 includes a waveform producing portion 32, an analog-to-digital (A/D) converter 34, an image processing portion 36, and a central processing unit (CPU) 38. The waveform producing portion 32 outputs the SP signal and the CLK signal. The A/D converter 34 subjects the output signal AO received from the image reader 12, to an analog-to-digital conversion. The image processing portion 36 processes an image represented by a digital image signal included in the thus converted output signal AO. The CPU 38 performs various processing operations.

Figure 4:
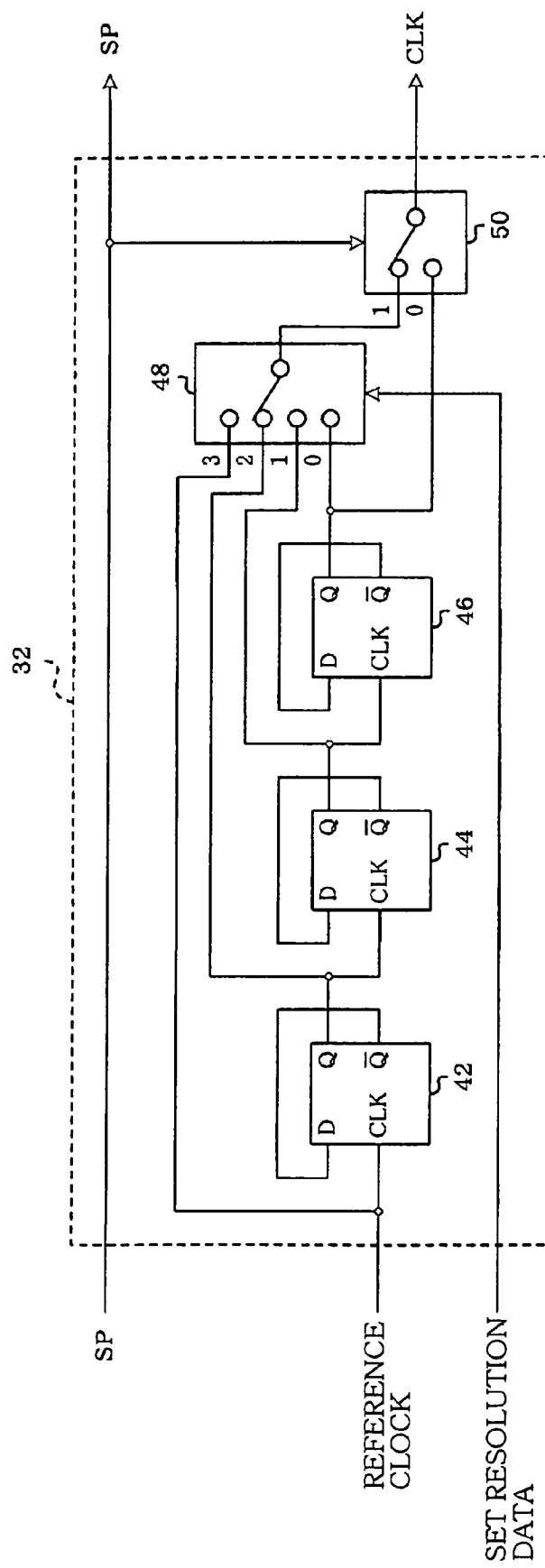
FIG. 4 is a diagrammatic view of an arrangement of a waveform producing portion of the image reading apparatus.

As shown in FIG. 4, the waveform producing portion 32 receives the SP signal that is produced by a start-signal producing portion, not shown, provided in the ASIC 30; a reference clock that is outputted from a reference-clock generator, not shown, provided in the ASIC 30 and is used as an operation clock of the CPU 38; and set resolution data that is outputted from the CPU 38. The SP signal is produced by the start-signal producing portion, based on the reference clock outputted from the reference-clock generator. The waveform producing portion 32 includes three D flip flops 42, 44, 46, and two selecting switches 48, 50. The selecting switch 48 is for selectively outputting one of four signals respectively inputted to four input terminals, 0, 1, 2, and 3, thereof; and the selecting switch 50 is for selectively outputting one of two signals respectively inputted to two input terminals, 0 and 1, thereof. As is apparent from FIG. 4, the SP signal inputted to the waveform producing portion 32 is identical with the SP signal outputted from the waveform producing portion 32.

In the waveform producing portion 32, the reference clock received from the reference-clock generator is inputted to both the input terminal 3 of the selecting switch 48 and the input terminal, CLK, of the flip flop 42. In the flip flop 42, an output signal from an output terminal, inverted Q, thereof is inputted to an input terminal, D, thereof, so that an output signal from an output terminal, Q, thereof is a pulse signal whose frequency is half a frequency of the reference clock inputted to the input terminal CLK thereof. This pulse signal is inputted to both the input terminal, 2, of the selecting switch 48 and an input terminal, CLK, of the flip flop 44.

Likewise, in the flip flop 44, an output signal from an output terminal, inverted Q, thereof is inputted to an input terminal, D, thereof, so that an output signal from an output terminal, Q, thereof is a pulse signal whose frequency is half the frequency of the pulse signal inputted to the input terminal CLK thereof, i.e., one fourth of the frequency of the reference clock. The former pulse signal is inputted to both the input terminal, 1, of the selecting switch 48 and an input terminal, CLK, of the flip flop 46.

Likewise, in the flip flop 46, an output signal from an output terminal, inverted Q, thereof is inputted to an input terminal, D, thereof, so that an output signal from an output terminal, Q, thereof is a pulse signal whose frequency is half the frequency of the pulse signal inputted to the input terminal CLK thereof, i.e., one eighth of the frequency of the reference clock. The former pulse signal is inputted to both the input terminal, 0, of the selecting switch 48 and an input terminal, 0, of the selecting switch 50.

Likewise, the selecting switch 48 selects, based on the set resolution data received from the CPU 38, one of the four signals inputted to the four input terminals 0, 1, 2, 3 thereof. More specifically described, the image reading apparatus 10 is operable by a user for selectively setting one of four reading resolutions, i.e., 1,200 dpi, 600 dpi, 300 dpi, and 150 dpi, and the CPU 38 outputs set resolution data representing the reading resolution set by the user. When the set resolution data received from the CPU 38 represents the highest reading resolution 1,200 dpi, the selecting switch 48 selects the pulse signal inputted to the input terminal 0; when the set resolution data represents the second highest reading resolution 600 dpi, the selecting switch 48 selects the pulse signal inputted to the input terminal 1; when the set resolution data represents the second lowest reading resolution 300 dpi, the selecting switch 48 selects the pulse signal inputted to the input terminal 2; and when the set resolution data represents the lowest reading resolution 150 dpi, the selecting switch 48 selects the reference clock inputted to the input terminal 3. The selecting switch 48 outputs the thus selected signal as an output signal thereof to an input terminal, 1, of the selecting switch 50.

The selecting switch 50 selects, based on the SP signal received from the start signal producing portion, one of the two signals inputted to the input terminals 0, 1 thereof, and outputs the thus selected signal as the CLK signal. More specifically described, while the SP signal takes a low voltage or level (i.e., an OFF state), the selecting switch 50 selects the signal inputted to the input terminal 0 thereof; and while the SP signal takes a high voltage or level (i.e., an ON state), the selecting switch 50 selects the signal inputted to the input terminal 1 thereof.

Figure 5:
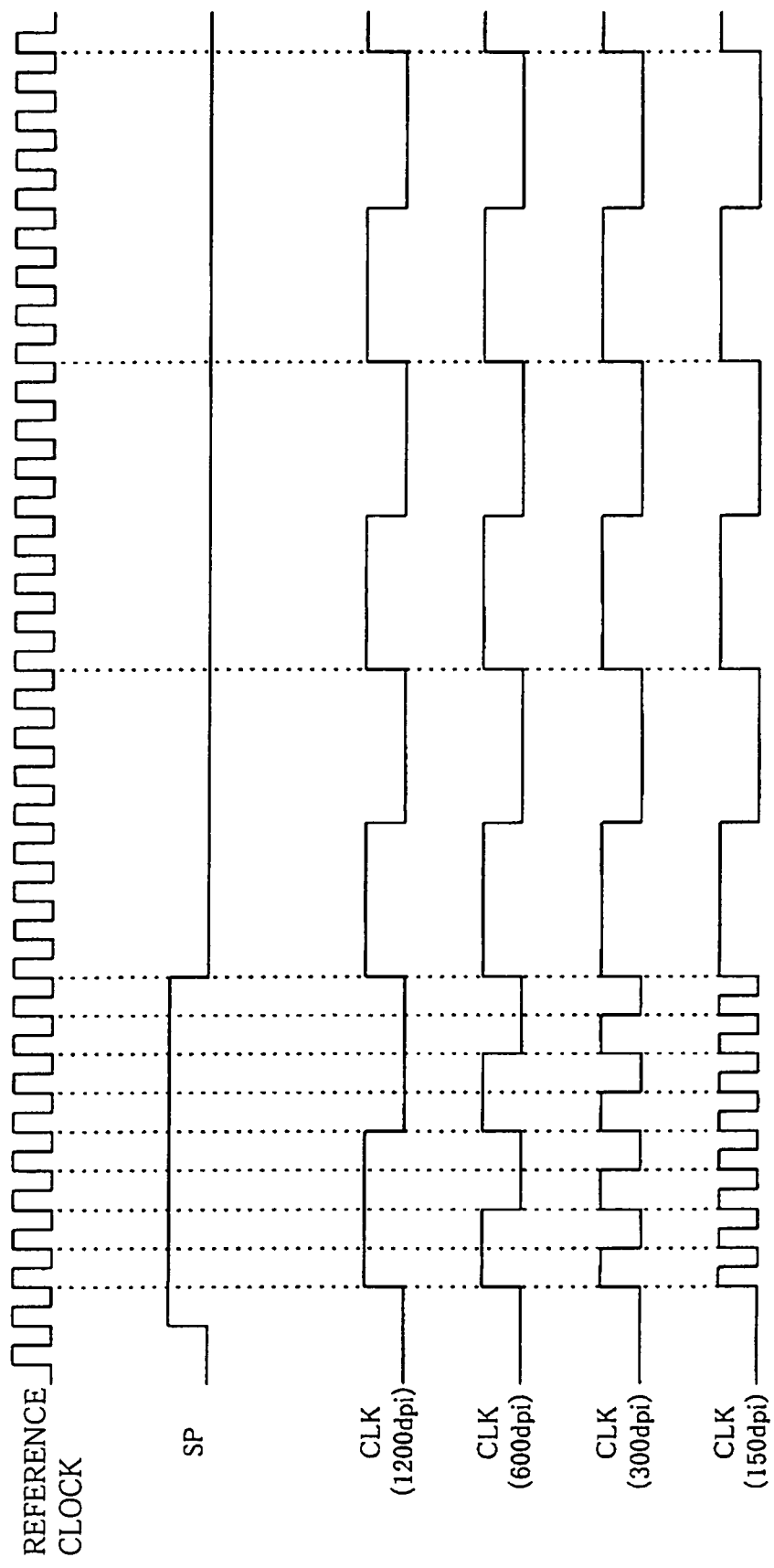
FIG. 5 is a view for explaining respective waveforms of output signals from the waveform producing portion of FIG. 4.

That is, while the SP signal takes the high level, the selecting switch 50 selects the signal inputted to the input terminal 1 thereof, and accordingly outputs, as the CLK signal, the signal received from the selecting switch 48. More specifically described, as shown in FIG. 5, when the set resolution data represents the reading resolution 1,200 dpi, the selecting switch 48 selects the input terminal 0 and outputs, as the CLK signal, the pulse signal whose frequency is one eighth of the frequency of the reference clock.

Likewise, when the set resolution data represents the reading resolution 600 dpi, the selecting switch 48 selects the input terminal 1 and outputs, as the CLK signal, the pulse signal whose frequency is one fourth of the frequency of the reference clock; when the set resolution data represents the reading resolution 300 dpi, the selecting switch 48 selects the input terminal 2 and outputs, as the CLK signal, the pulse signal whose frequency is half the frequency of the reference clock; and when the set resolution data represents the reading resolution 150 dpi, the selecting switch 48 selects the input terminal 3 and outputs, as the CLK signal, the reference clock as it is.

In the image reading apparatus 10, a pulse width of the SP signal, i.e., a time duration of the high level of the SP signal is constant, and a number of pulses of the CLK signal that are outputted during the constant time duration of the high level of the SP signal, i.e., a number of pulse falls of the CLK signal that occur during the constant time duration represents the set reading resolution. In the present embodiment, when the reading resolution is 1,200 dpi, the number of pulse falls or fall of the CLK signal during the time duration of the high level of the SP signal is 1; when the reading resolution is 600 dpi, the number of pulse falls of the CLK signal during the time duration is 2; when the reading resolution is 300 dpi, the number of pulse falls of the CLK signal during the time duration is 4; and when the reading resolution is 150 dpi, the number of pulse falls of the CLK signal during the time duration is 8.

Meanwhile, while the SP signal takes the low level, the selecting switch 50 selects the signal inputted to the input terminal 0 thereof, and accordingly outputs, as the CLK signal, the pulse signal whose frequency is one eighth of the frequency of the reference clock. Therefore, when the reading resolution is 1,200 dpi, the frequency of the CLK signal is not changed irrespective of whether the SP signal takes the high or low level.

The image processing portion 36 includes a memory (i.e., a line buffer, not shown) that stores the digital output signal AO converted from the analog output signal AO by the A/D converter 34; and a processor that processes the image represented by the signal AO stored by the memory.

Figure 6:
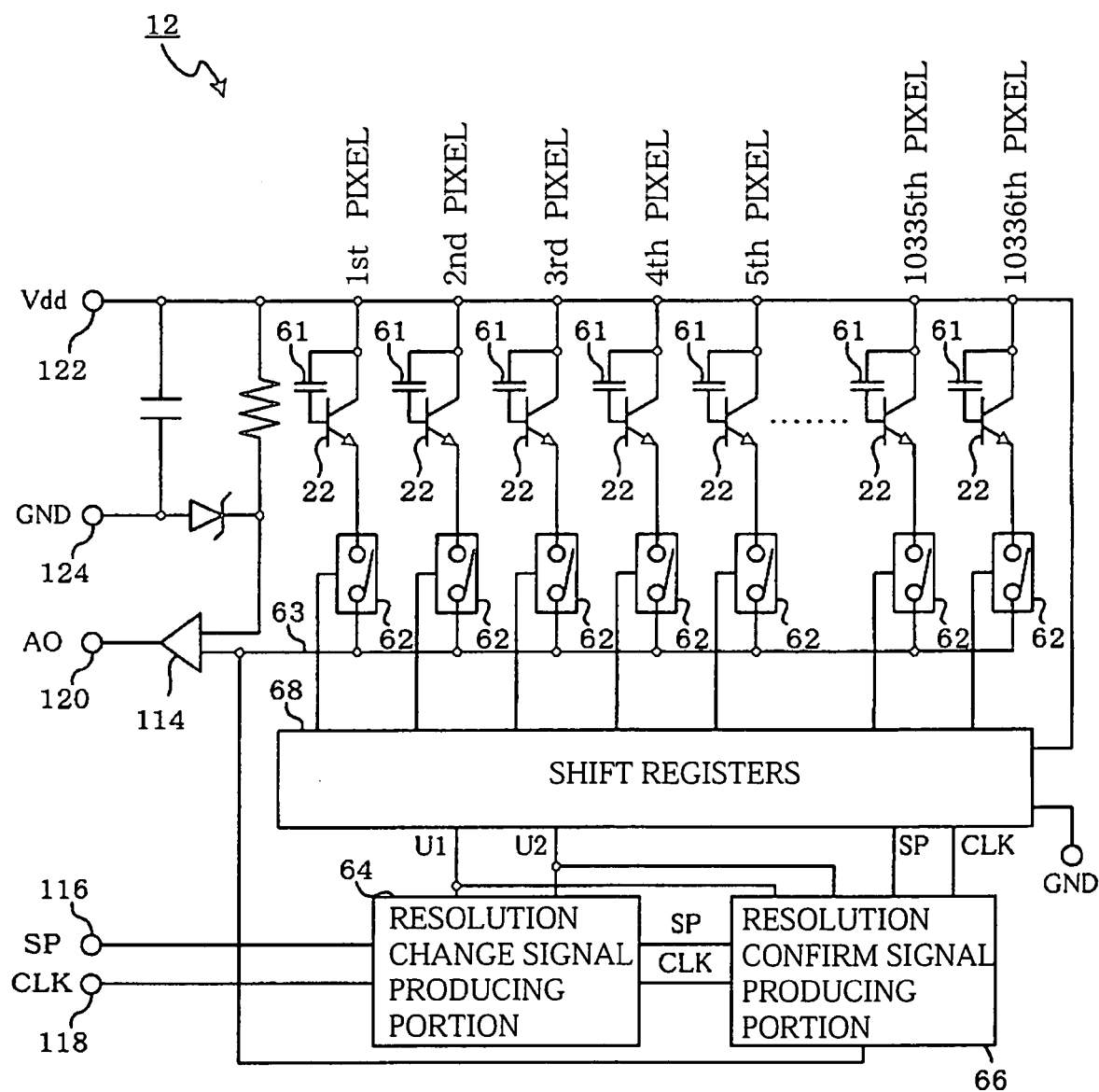
FIG. 6 is a diagrammatic view of an arrangement of an image reader of the image reading apparatus.

Next, an arrangement of the image reader 12 will be described. As shown in FIG. 6, the image reader 12 includes a plurality of photoelectric transducers (e.g., phototransistors) 22, 22, . . . that are arranged along a straight line; and a plurality of switching elements (i.e., channel selecting switches) 62, 62, . . . that correspond to the photoelectric transducers 22, respectively, and each of which connects, and disconnects, a corresponding one of the photoelectric transducers 22 to, and from, an output signal line 63. In addition, the image reader 12 includes a resolution change signal producing portion 64, a resolution confirm signal producing portion 66, and shift registers 68. The resolution change signal producing portion 64 produces two resolution change signals, U1, U2, based on the SP signal received via an SP terminal 116 thereof from the ASIC 30 and the CLK signal received via a CLK terminal 118 thereof from the ASIC 30. The resolution confirm signal producing portion 66 produces, based on the resolution change signals U1, U2, a resolution confirm signal, and outputs the thus produced resolution confirm signal as part of the output signal AO to the ASIC 30 via the output signal line 63 and an AO terminal 120. The shift registers 68 control, according to a control pattern corresponding to the resolution change signals U1, U2, the respective switching operations of the switching elements 62 that are for connecting, and disconnecting, the corresponding photoelectric transducers 22 to, and from, the output signal line 63. The image reader 12 additionally includes a Vdd terminal 122 to which a source voltage, Vdd, is applied; and a GND terminal 124 that is grounded.

Each of the photoelectric transducers 22 is connected to a capacitor 61 and, after the each transducer 22 converts a light (i.e., a light signal) reflected from a document, into electric charges (i.e., an electric signal), the each transducer 22 stores the electric charges in the corresponding capacitor 61. In the present embodiment, the image reader 12 employs 10,336 photoelectric transducers 22 that are arranged on a straight line in a density corresponding to the reading resolution 1,200 dpi and cooperate with each other to read each line in an image on the document.

Figure 7:
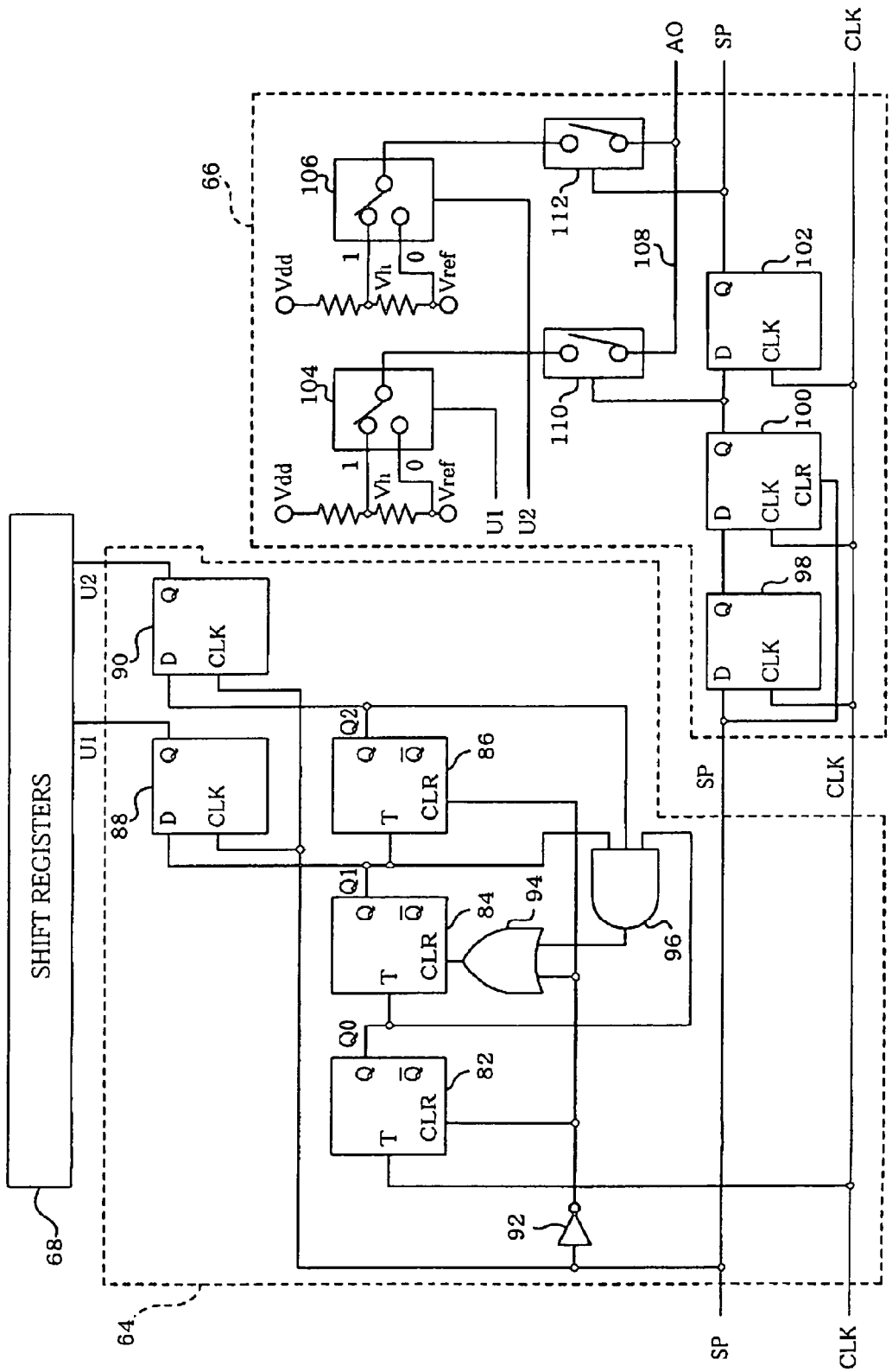
FIG. 7 is a diagrammatic view of respective arrangements of a resolution change signal producing portion and a resolution confirm signal producing portion of the image reading apparatus.

As shown in FIG. 7, the resolution change signal producing portion 64 produces the resolution change signals U1, U2, based on the SP signal and the CLK signal received from the ASIC 30, and outputs the resolution change signals U1, U2, the SP signal, and the CLK signal. The resolution change signal producing portion 64 includes three T flip flops 82, 84, 86, and two D flip flops 88, 90. As is apparent from FIG. 7, the SP signal and the CLk signal, inputted to the resolution change signal producing portion 64, are identical with the SP signal and the CLk signal, outputted from the same 64, respectively.

In the resolution change signal producing portion 64, the SP signal received from the ASIC 30 is inputted to respective input terminals, CLK, of the two flip flops 88, 90, and also inputted to respective input terminals, CLR, of the three flip flops 82, 84, 86 each via a NOT circuit 92. In particular, the SP signal is inputted to the flip flop 84 via an OR circuit 94 following the NOT circuit 92.

The CLK signal received from the ASIC 30 is inputted to an input terminal, T, of the flip flop 82. An output signal Q0 from an output terminal, Q, of the flip flop 82 is inputted to both an input terminal, T, of the flip flop 84 and an AND circuit 96. An output signal Q1 from an output terminal, Q, of the flip flop 84 is inputted to an input terminal, T, of the flip flop 86, the AND circuit 96, and an input terminal, D, of the flip flop 88. An output signal Q2 from an output terminal, Q, of the flip flop 86 is inputted to the AND circuit 96 and an input terminal, D, of the flip flop 90. Thus, the AND circuit 96 receives the respective output signals from the flip flops 82, 84, 86 and, when all those output signals Q0, Q1, Q2 take respective high levels, the AND circuit 96 outputs an output signal taking a high level. The output signal from the AND circuit 96 is inputted to the OR circuit 94.

An output signal, U1, from an output terminal, Q, of the flip flop 88 and an output signal, U2, from an output terminal, Q, of the flip flop 90 are inputted as the resolution change signals U1, U2 to the shift registers 68. Thus, the resolution change signal producing portion 64 is arranged such that while the SP signal takes the low level, the flip flops 82, 84, 86 are each in a reset state and the resolution change signals U1, U2 are both at zero level (0).

Then, while the SP signal takes the high level, the output signal Q0 from the output terminal Q of the flip flop 82 takes respective levels of 1, 0, 1, 0, 1, . . . in the order of description at respective timings when the respective pulses of the CLK signal fall. In addition, the output signal Q1 from the output terminal Q of the flip flop 84 takes respective levels of 1, 0, 1, 0, 1, . . . in the order of description at respective timings when the respective pulses of the signal Q0 inputted to the input terminal T thereof fall. Thus, the output signal Q1 takes respective levels of 0, 1, 1, 0, 0, 1, 1, 0, . . . in the order of description at the respective timings when the respective pulses of the CLK signal fall.

In addition, the output signal Q2 from the output terminal Q of the flip flop 86 takes respective levels of 1, 0, 1, 0, 1, . . . in the order of description at respective timings when the respective pulses of the signal Q1 inputted to the input terminal T thereof fall. Thus, the output signal Q2 takes respective levels of 0, 0, 0, 1, 1, 1, 1, 0, . . . in the order of description at the respective timings when the respective pulses of the CLK signal fall.

However, when the respective output signals Q0, Q1, Q2 from the respective output terminals Q of the flip flops 82, 84, 86 all take one (1), the output of the AND circuit 96 turns to one (1) and accordingly the output of the OR circuit 94 turns to one (1). Thus, the flip flop 84 is changed to its reset state and the output signal Q1 from the same 84 turns to zero (0). TABLE 1 shows a relationship between the number of pulse falls of the CLK signal after the CLK signal has changed from the low level to the high level, and the respective contents of the three output signals Q0, Q1, Q2. TABLE 1 shows that at the timing when the seventh pulse of the CLK signal falls, the respective contents of the three output signals Q0, Q1, Q2 are 1, 1, 1, respectively. In this case, however, the content of the output signal Q1 immediately changes from one (1) to zero (0), as explained above., Then, when the SP signal changes from the high level to the low level, the input signal Q1 inputted to the input terminal D of the flip flop 88 is outputted as the resolution change signal U1 from the output terminal Q thereof, and the input signal Q2 inputted to the input terminal D of the flip flop 90 is outputted as the resolution change signal U2 from the output terminal Q thereof. TABLE 2 shows a relationship between the number of pulse falls of the CLK signal while the SP signal takes the high level, and the respective contents of the three output signals Q0, Q1, Q2.

TABLE 1

| CLK NUMBER OF PULSE FALLS | Q0 | Q1 | Q2 |
|---|---|---|---|
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |
| 8 | 0 | 1 | 1 |

TABLE 2

| CLK NUMBER OF PULSE FALLS | U1 | U2 | RESOLUTION (dpi) |
|---|---|---|---|
| 1 | 0 | 0 | 1,200 |
| 2 | 1 | 0 | 600 |
| 4 | 0 | 1 | 300 |
| 8 | 1 | 1 | 150 |

As explained above, the number of pulse falls of the CLK signal that occur while the SP signal takes the high level, represents the set reading resolution indicated by the ASIC 30. Thus, TABLE 2 shows that respective values 0, 0 of the resolution change signals U1, U2 corresponding to the number, 1, of pulse fall(s) of the CLK signal represents the reading resolution, 1,200 dpi; respective values 1, 0 of the signals U1, U2 corresponding to the number, 2, of pulse fall(s) of the CLK signal represents the reading resolution, 600 dpi; respective values 0, 1 of the signals U1, U2 corresponding to the number, 4, of pulse fall(s) of the CLK signal represents the reading resolution, 300 dpi; and respective values 1, 1 of the signals U1, U2 corresponding to the number, 8, of pulse fall(s) of the CLK signal represents the reading resolution, 150 dpi. According to the resolution change signals U1, U2, i.e., the reading resolution indicated by the ASIC 30, the shift registers 68 are operated. An operation of the shift registers 68 will be described in detail, later.

As shown in FIG. 7, the resolution confirm signal producing portion 66 receives, from the resolution change signal producing portion 64, the SP signal and the CLK signal, and outputs the output signal AO, the SP signal, and the CLK signal. The resolution confirm signal producing portion 66 includes three D flip flops 98, 100, 102, two selecting switches 104, 106, and two switching elements 110, 112. Each of the selecting switches 104, 106 is for selectively outputting one of the respective signals inputted to two input terminals, 0, 1, thereof, and each of the switching elements 110, 112 is for connecting, and disconnecting, an output terminal of a corresponding one of the two selecting switches 104, 106 to, and from, a signal line 108 that is connected to the output signal line 63. As is apparent from FIG. 7, the CLK signal inputted to the resolution confirm signal producing portion 66 is identical with the CLK signal outputted from the same 66.

The input terminal 0 of the selecting switch 104 receives a low-potential voltage, Vref, and the input terminal 1 of the same 104 receives a divided voltage, Vh, between a high-potential voltage, Vdd, and the low-potential voltage Vref. When the resolution change signal U1 represents the value of 0, the selecting switch 104 selects the signal inputted to the input terminal 0 thereof, and when the resolution change signal U1 represents the value of 1, the selecting switch 104 selects the signal inputted to the input terminal 1 thereof. The low-potential voltage Vref is a reference voltage for an amplifier 114 (FIG. 6) that amplifies the image signal. When the low-potential voltage Vref is inputted to the amplifier 114, the amplifier 114 outputs, as the output signal AO, a voltage corresponding to the low level of the image signal; and when the divided voltage Vh is inputted to the amplifier 114, the amplifier 114 outputs, as the output signal AO, a voltage corresponding to the high level of the image signal.

Likewise, the input terminal 0 of the selecting switch 106 receives the low-potential voltage Vref, and the input terminal 1 of the same 106 receives the divided voltage Vh. When the resolution change signal U2 represents the value of 0, the selecting switch 106 selects the signal inputted to the input terminal 0 thereof; and when the resolution change signal U2 represents the value of 1, the selecting switch 106 selects the signal inputted to the input terminal 1 thereof.

While an output signal from an output terminal, Q, of the flip flop 100 takes a high level, the switching element 110 connects the selecting switch 104 to the signal line 108; and while the output signal takes a low level, the switching element 110 disconnects the selecting switch 104 from the signal line 108. Likewise, while an output signal from an output terminal, Q, of the flip flop 102 takes a high level, the switching element 112 connects the selecting switch 106 to the signal line 108; and while the output signal takes a low level, the switching element 112 disconnects the selecting switch 106 from the signal line 108.

In the resolution confirm signal producing portion 66, the SP signal received from the resolution change signal producing portion 64, is inputted to an input terminal, D, of the flip flop 98 and an input terminal, CLR, of the flip flop 100; and the CLK signal received from the same 64 is inputted to respective input terminals, CLK, of the three flip flops 98, 100, 102.

An output signal from an output terminal, Q, of the flip flop 98 is inputted to an input terminal, D, of the flip flop 100. The output signal from the output terminal Q of the flip flop 100 is inputted to not only the switching element 110 but also an input terminal, D, of the flip flop 102. An output signal from an output terminal, Q, of the flip flop 102 is inputted to the switching element 112, and additionally the output signal is inputted, as the SP signal, to the shift registers 68.

Figure 8:
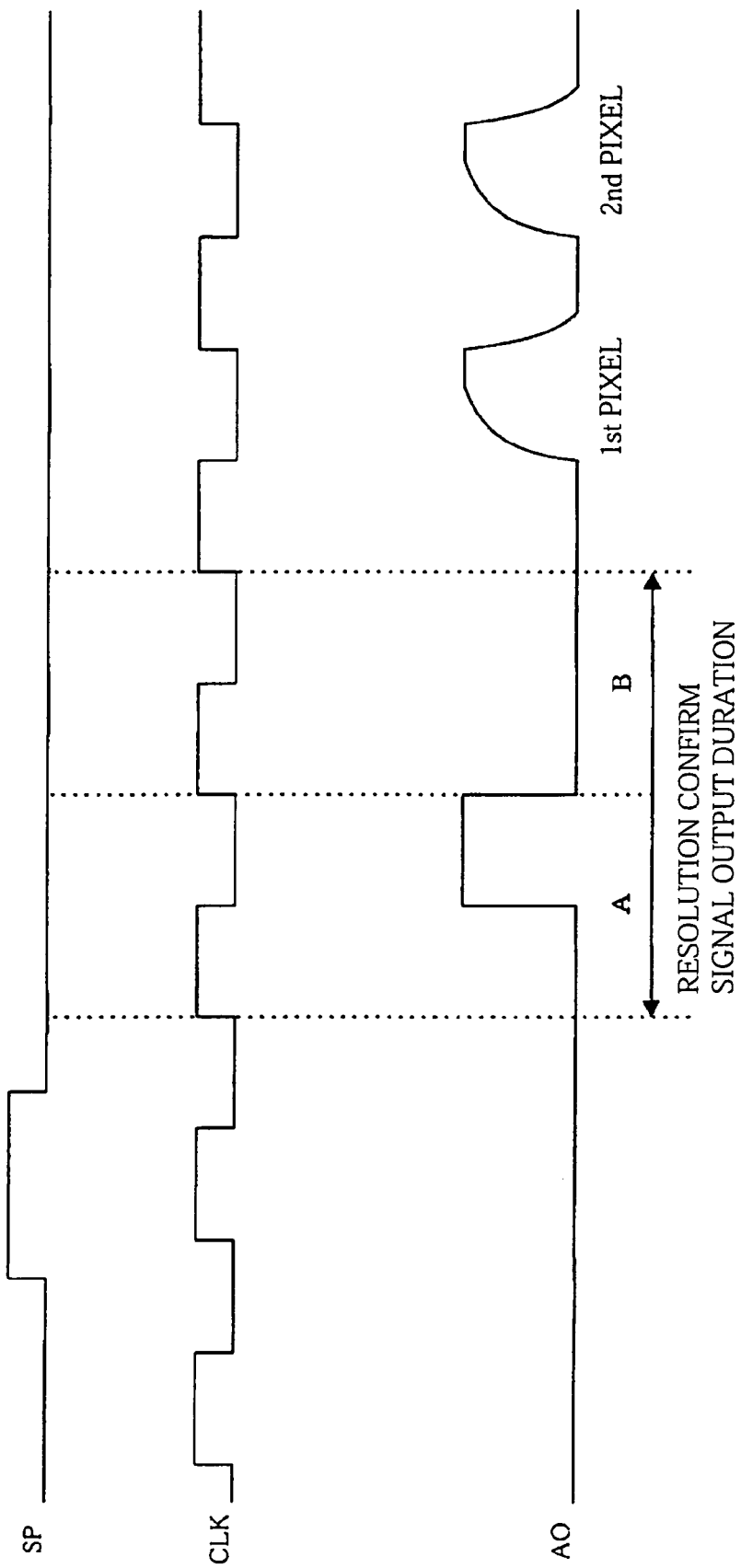
FIG. 8 is a view for explaining a waveform of an output signal from the image reader.

Since the resolution confirm signal producing portion 66 is arranged as described above, this portion 66 is operated such that while the SP signal takes the high level, the output signal from the output terminal Q of the flip flop 98 takes the high level at a timing when the CLK signal falls. However, the flip flop 100 to the input terminal D of which the above output signal is inputted is kept in a reset state while the SP signal takes the high level, so that the switching elements 110, 112 disconnect the corresponding selecting switches 104, 106 from the signal line 108. Therefore, as shown in FIG. 8, the output signal AO takes the low level while the SP signal takes the high level.

Then, after the SP signal falls down to the low level, the output signal from the output terminal Q of the flip flop 98 takes the high level at a timing when the CLK signal next falls, and simultaneously the output signal from the output terminal Q of the flip flop 100 takes the high level, so that the switching element 110 connects the selecting switch 104 to the signal line 108. Therefore, if the resolution change signal U1 represents the value of 1, the output signal AO takes the high level, as shown in FIG. 8; and, if the resolution change signal U1 represents the value of 0, the output signal AO takes the low level.

Then, at a timing when the CLK signal next falls, the output signal from the output terminal Q of the flip flop 100 takes the low level, so that the switching element 110 disconnects the selecting switch 104 from the signal line 108, and simultaneously the output signal from the output terminal Q of the flip flop 102 takes the high level, so that the switching element 112 connects the selecting switch 106 to the signal line 108. Therefore, if the resolution change signal U2 represents the value of 1, the output signal AO takes the high level; and, if the resolution change signal U1 represents the value of 0, the output signal AO takes the low level, as shown in FIG. 8. In addition, at this timing, the SP signal outputted to the shift register 68 takes the high level.

Then, at a timing when the CLK signal next falls, the output signal from the output terminal Q of the flip flop 102 takes the low level, so that the switching element 112 disconnects the selecting switch 106 from the signal line 108. In addition, at this timing, the SP signal outputted to the shift register 68 takes the low level. TABLE 3 shows a relationship between the two resolution change signals U1, U2 and two resolution confirm signal output durations, A, B, shown in FIG. 8.

TABLE 3

| U1 | U2 | RESOLUTION (dpi) | A | B |
|---|---|---|---|---|
| 0 | 0 | 1,200 | L | L |
| 1 | 0 | 600 | H | L |
| 0 | 1 | 300 | L | H |
| 1 | 1 | 150 | H | H |

As shown in TABLE 3, in the case where the resolution change signals U1, U2 represent the values 0, 0, respectively, that is, the set resolution is 1,200 dpi, the output signal AO takes the low level, L, in each of the resolution confirm signal output durations A, B. In the case where the resolution change signals U1, U2 represent the values 1, 0, respectively, that is, the set resolution is 600 dpi, the output signal AO takes the high level, H, in the output duration A, and takes the low level L in the output duration B. In the case where the resolution change signals U1, U2 represent the values 0, 1, respectively, that is, the set resolution is 300 dpi, the output signal AO takes the high level H in the output duration B, and takes the low level L in the output duration A. In the case where the resolution change signals U1, U2 represent the values 1, 1, respectively, that is, the set resolution is 150 dpi, the output signal AO takes the high level H in each of the output durations A, B.

Figure 9:
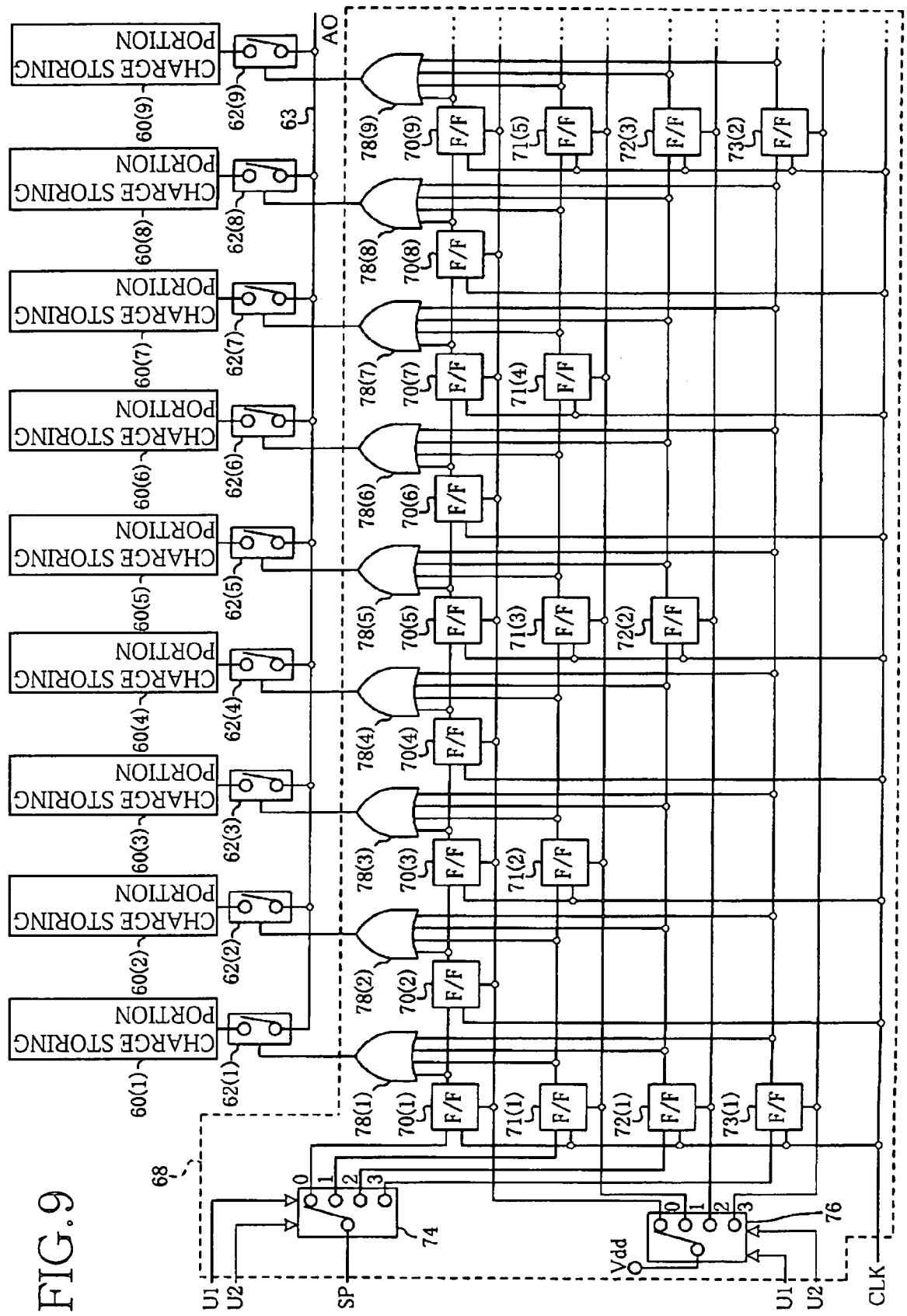
FIG. 9 is a diagrammatic view of an arrangement of shift registers of the image reading apparatus.

Next, there will be described an arrangement of the shift registers 68. As shown in FIG. 9, the shift registers 68 include D flip flops 70(1), 70(2), . . . , 70(n) (hereinafter, referred to as the first array of flip flops 70, where appropriate) corresponding, one to one, to the switching elements 62(1), 62(2), . . . , 62(n); D flip flops 71(1), 71(2), . . . , 71(n/2) (hereinafter, referred to as the second array of flip flops 71, where appropriate) corresponding, one to two, to the switching elements 62(1), 62(2), . . . , 62(n); D flip flops 72(1), 72(2), . . . , 71(n/4) (hereinafter, referred to as the third array of flip flops 72, where appropriate) corresponding, one to four, to the switching elements 62(1), 62(2), 62(n); and D flip flops 73(1), 73(2), . . . , 73(n/8) (hereinafter, referred to as the fourth array of flip flops 73, where appropriate) corresponding, one to eight, to the switching elements 62(1), 62(2), . . . , 62(n). Each of the above-described photoelectric transducers 22 and a corresponding one of the capacitors 61 cooperate with each other to provide a corresponding one of a plurality of charge storing portions 60.

In the shift registers 68, the CLK signal received from the resolution confirm signal producing portion 6 is inputted to an input terminal (CLK, not shown) of each of the flip flops 70, 71, 72, 73. An output signal from an output terminal (Q, not shown) of each of the flip flops 70, 71, 72, 73 is inputted to both corresponding one, two, four, or eight OR circuits out of OR circuits 78(1), 78(2), . . . , 78(n) corresponding, one to one, to the switching elements 62(1), 62(2), . . . , 62(n), and an input terminal (D, not shown) of another flip flop that follows the each flip flop 70, 71, 72, 73 in the same array.

In addition, the shift registers 68 include two selecting switches 74, 76. The selecting switch 74 is for receiving, at an input terminal thereof, the SP signal from the resolution confirm signal producing portion 66 and selectively outputting the received SP signal to one of four output terminals, 0, 1, 2, 3, thereof. The selecting switch 76 is for receiving, at an input terminal thereof, the source voltage Vdd to drive the flip flops 70 to 73 and selectively outputting the received source voltage to one of four output terminals, 0, 1, 2, 3, thereof.

The selecting switch 74 selects, based on the resolution change signals U1, U2 received from the resolution change signal producing portion 64, one of the four output terminals 0, 1, 2, 3 thereof. More specifically described, in the case where the resolution change signals U1, U2 represent the respective values 0, 0, i.e., the resolution of 1,200 dpi, the selecting switch 74 selects the output terminal 0, so that the SP signal is inputted to the input terminal (D, not shown) of the first flip flop 70(1) of the first array. In the case where the resolution change signals U1, U2 represent the respective values 1, 0, i.e., the resolution of 600 dpi, the selecting switch 74 selects the output terminal 1, so that the SP signal is inputted to the input terminal (D, not shown) of the first flip flop 71(1) of the second array. In the case where the resolution change signals U1, U2 represent the respective values 0, 1, i.e., the resolution of 300 dpi, the selecting switch 74 selects the output terminal 2, so that the SP signal is inputted to the input terminal (D, not shown) of the first flip flop 72(1) of the third array. In the case where the resolution change signals U1, U2 represent the respective values 1, 1, i.e., the resolution of 150 dpi, the selecting switch 74 selects the output terminal 3, so that the SP signal is inputted to the input terminal (D, not shown) of the first flip flop 73(1) of the fourth array.

Likewise, in the case where the resolution change signals U1, U2 represent the respective values 0, 0, i.e., the resolution of 1,200 dpi, the selecting switch 76 selects the output terminal 0, so that the source voltage is inputted to respective input terminals (ENB, not shown) of the flip flops 70(1), 70(2), . . . , 70(n) of the first array. In the case where the resolution change signals U1, U2 represent the respective values 1, 0, i.e., the resolution of 600 dpi, the selecting switch 74 selects the output terminal 1, so that the source voltage is inputted to respective input terminals (ENB, not shown) of the flip flops 71(1), 71(2), . . . , 71(n) of the second array. In the case where the resolution change signals U1, U2 represent the respective values 0, 1, i.e., the resolution of 300 dpi, the selecting switch 76 selects the output terminal 2, so that the source voltage is inputted to respective input terminals (ENB, not shown) of the flip flops 72(1), 72(2), . . . , 72(n) of the third array. In the case where the resolution change signals U1, U2 represent the respective values 1, 1, i.e., the resolution of 150 dpi, the selecting switch 76 selects the output terminal 3, so that the source voltage is inputted to respective input terminals (ENB, not shown) of the flip flops 73(1), 73(2), . . . , 73(n) of the fourth array.

Here, an operation of the shift registers 68 that corresponds to each of the four degrees of reading resolution is explained. In the case of the resolution of 1,200 dpi (i.e., the highest degree of resolution in the present embodiment), the first array of flip flops 70(1), 70(2), . . . , 70(n) are operated. More specifically described, at respective timings when the CLK signal iteratively falls after the SP signal is inputted to the first flip flop 70(1), the switching elements 62(1), 62(2), . . . , 62(n) are sequentially turned ON, one by one, to connect the corresponding change storing portions 60 each to the output signal line 63. Thus, the electric charges (i.e., electric signals) stored by the charge storing portions 60 (more specifically, the capacitors 61) are outputted as an image signal representing a read image at the highest resolution of 1,200 dpi.

In the case of the resolution of 600 dpi, the second array of flip flops 71(1), 71(2), . . . , 71(n) are operated. More specifically described, at respective timings when the CLK signal iteratively falls after the SP signal is inputted to the first flip flop 71(1), the switching elements 62(1), 62(2), . . . , 62(n) are sequentially turned ON, two by two, to connect the corresponding change storing portions 60 each to the output signal line 63. Thus, the electric charges stored by the charge storing portions 60 are outputted as an image signal representing a read image at the resolution of 600 dpi.

In the case of the resolution of 300 dpi, the third array of flip flops 72(1), 72(2), . . . , 71(n) are operated. More specifically described, at respective timings when the CLK signal iteratively falls after the SP signal is inputted to the first flip flop 72(1), the switching elements 62(1), 62(2), . . . , 62(n) are sequentially turned ON, four by four, to connect the corresponding change storing portions 60 each to the output signal line 63. Thus, the electric charges stored by the charge storing portions 60 are outputted as an image signal representing a read image at the resolution of 300 dpi.

In the case of the resolution of 150 dpi, the fourth array of flip flops 73(1), 73(2), . . . , 73(n) are operated. More specifically described, at respective timings when the CLK signal iteratively falls after the SP signal is inputted to the first flip flop 73(1), the switching elements 62(1), 62(2), . . . , 62(n) are sequentially turned ON, eight by eight, to connect the corresponding change storing portions 60 each to the output signal line 63. Thus, the electric charges stored by the charge storing portions 60 are outputted as an image signal representing a read image at the resolution of 150 dpi.

The image signal is outputted as the output signal AO to the ASIC 30. As described above, the resolution confirm signal is outputted by the resolution confirm signal producing portion 66, before the image signal is outputted. Therefore, the image signal follows the resolution confirm signal, as shown in FIG. 8.

Figure 10:
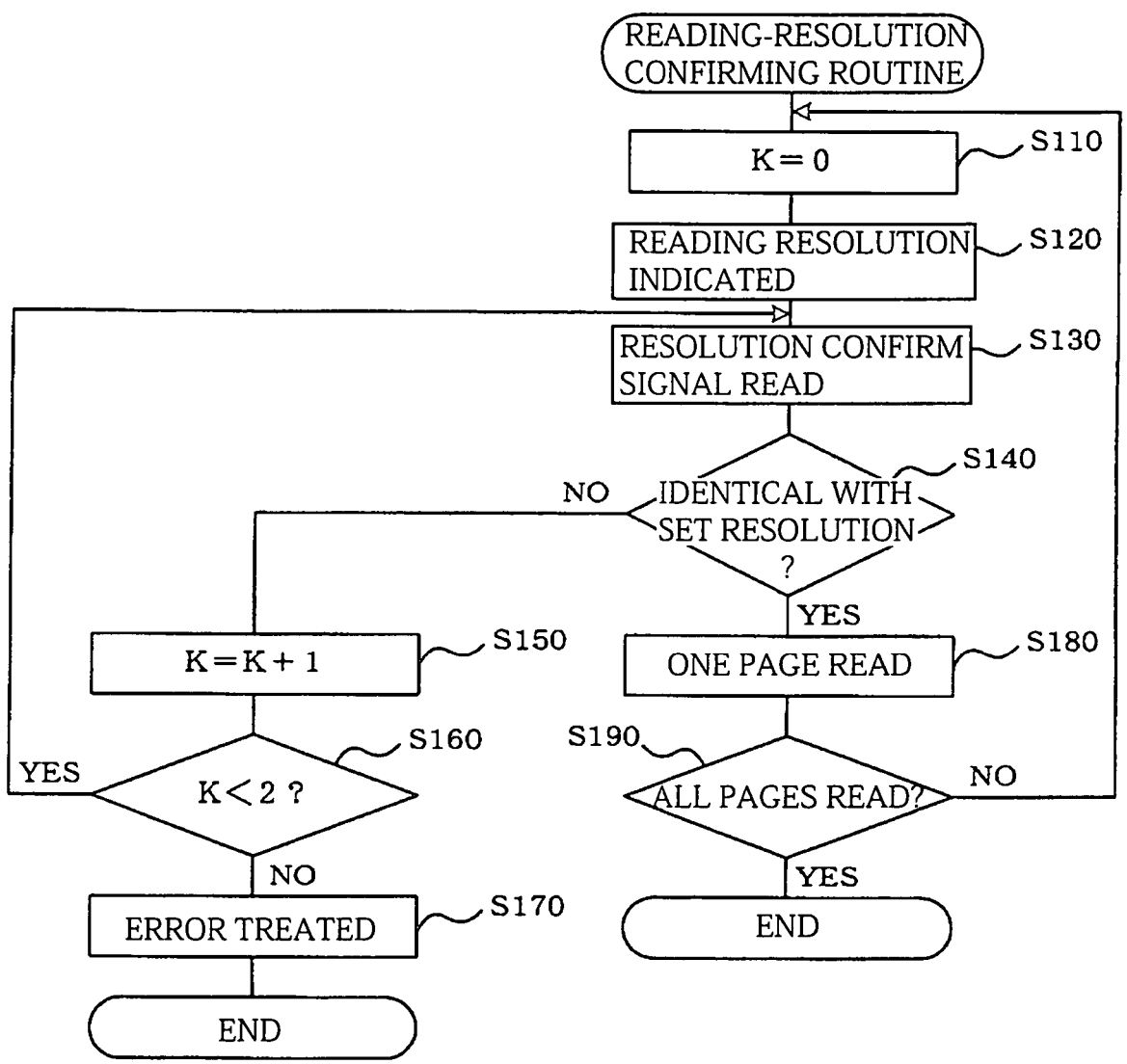
FIG. 10 is a flow chart representing a reading-resolution confirming routine.

Next, there will be described a reading-resolution confirming operation of the CPU 38 of the ASIC 30, by reference to the flow chart shown in FIG. 10. This operation is started when a user operates the operation panel 2 to start reading a document.

In the reading-resolution confirming operation, first, at Step S110, the CPU 38 resets a value of a counter, K, to 0 (i.e., K=0). Subsequently, at Step S120, the CPU 38 outputs the set resolution data representing the reading resolution set by the user. As described previously, the set resolution data is inputted to the waveform producing portion 32 and subsequently, when the SP signal produced by the start-signal producing portion, not shown, takes the high level, the CLK signal is changed to have the frequency selected based on the set resolution data, so that the set resolution is indicated from the ASIC 30 to the image reader 12.

Then, at Step S130, the CPU 38 reads the resolution confirm signal. As described above, the resolution confirm signal leads the image signal, and is outputted as the output signal AO from the image reader 12 to the ASIC 30. The output signal AO is subjected to the A/D conversion by the A/D converter 34, and the thus converted signal AO is stored by the memory (i.e., the line buffer, not shown) of the image processing portion 36. Thus, at Step S130, the CPU 38 reads the resolution confirm signal by reading the first two bit data stored by the memory of the image processing portion 36. The CPU 38 needs to read the resolution confirm signal at a timing after the signal is outputted from the image reader 12 to the ASIC 30. This timing may be indicated by interruption from the image processing portion 36 to the CPU 38.

After, at Step S130, the CPU 38 reads the resolution confirm signal, the control of the CPU 38 proceeds with Step S140 to judge whether the resolution represented by the thus read resolution confirm signal is identical with the set resolution, i.e., the resolution that is represented by the number of pulse falls of the CLK signal during the time duration in which the SP signal takes the high level and is indicated to the image reader 12.

If, at Step S140, it is judged that the resolution represented by the thus read resolution confirm signal is not identical with the set resolution, the control goes to Step S150 to add one to the value of counter K (i.e., K=K+1). Then, at Step 160, the CPU 38 judges whether the value of counter K is smaller than two (i.e., K<2?).

If, at Step S160, it is judged that the value of counter K is smaller than two, that is, that the value of counter K is one (i.e., K=1), the control goes back to Step S130 to read once more the resolution confirm signal and then to Step S140 to judge whether the resolution represented by the thus read resolution confirm signal is identical with the set resolution. If, at Step S140, it is judged again that the resolution represented by the resolution confirm signal is not identical with the set resolution, the control goes to Step S150 to add one to the value of counter K, so that the value of counter K is increased to two (i.e., K=2). Thus, at Step S160, it is judged that the value of counter K is not smaller than two, and the control goes to Step S170.

At Step S170, the CPU 38 treats an error that the resolution has not normally been indicated to the image reader 12. More specifically described, the CPU 38 controls a liquid crystal display (LCD) of the operation panel 2 to display a message "RESOLUTION HAS NOT NORMALLY BEEN INDICATED", and additionally controls a buzzer, not shown, of the complex apparatus 1 to produce an alarm sound. Then, the CPU 38 terminates the current reading resolution confirming operation, and controls the image processing portion 36 not to process the image represented by the image signal received thereafter from the image reader 12. That is, the CPU 38 judges that the resolution has not normally been indicated by the ASIC 30 to the image reader 12, and aborts the current image reading operation.

On the other hand, if, at Step S140, it is judged that the resolution represented by the resolution confirm signal is identical with the set resolution, the control goes to Step S180 to read an image corresponding to one page of the document. More specifically described, the CPU 38 indicates, to the image processing portion 36, start and end addresses in the memory of the same 36, so that the processing portion 36 processes, and thereby reads, only the data stored between the start and end addresses in the memory. In other words, the CPU 38 controls the image processing portion 36 not to read the first two bit data in each line, i.e., the resolution confirm signal. In addition, the CPU 38 judges whether reading of one page of the document has been finished, based on a detected condition of that page and, if a positive judgment is made, the control goes to Step S190.

At Step S190, the CPU 38 judges whether reading of all pages of the document to be read have been finished. If a negative judgment is made at Step S190, the control goes back to Step S110 to carry out the same operation on another page of the document. Thus, the present reading apparatus 1 can set a reading resolution for each page of a document, and can confirm, one time, the reading resolution set for the each page. On the other hand, if, at Step S190, it is judged that all pages of the document have been read, the CPU 38 terminates the current reading resolution confirming routine.

Thus, in the present image reading apparatus 10, the waveform producing portion 32 of the ASIC 30 changes the frequency of the CLK signal during the time duration in which the SP signal takes the high level, and thereby indicates the set resolution to the image reader 12.

In the image reader 12, the resolution change signal producing portion 64 produces the resolution change signals U1, U2 that cooperate with each other to represent the resolution corresponding to the number of pulse falls of the CLK signal during the time duration in which the SP signal takes the high level, and outputs the signals U1, U2 to the shift registers 68, thereby selecting the reading resolution of the image reader 12. In addition, the resolution confirm signal producing portion 66 produces, at the respective timings when the CLK signal falls for the first and second times after the SP signal falls down to the low level, the respective resolution confirm signals that cooperate with each other to represent the resolution corresponding to the signals U1, U2, and outputs the resolution confirm signals to the ASIC 30. The shift registers 68 commence, at the timing when the CLK signal falls for the third time after the SP signal falls down to the low level, operating the switching elements 62 in the manner corresponding to the signals U1, U2, thereby reading one line in the image on the document. Thus, the resolution confirm signal and the image signal are outputted as the output signal AO from the image reader 12 to the ASIC 30.

The SP signal outputted from the ASIC 30 to the image reader 12 is for indicating, to the image reader 12, commencement of reading of each line in an image. Therefore, for each line, one resolution is indicated from the ASIC 30 to the image reader 12, so that resolution change signals U1, U2 and resolution confirm signals are produced and outputted for the each line. In the case where a full-color image is read, three image reading operations are carried out, independent of each other, using the light source 26 including red (R), green (G), and blue (B) LEDs (light emitting diodes). In this case, too, an SP signal is used to indicate, to the image reader 12, commencement of reading of each line in the full-color image, so that resolution confirm signals lead each of the three image signals corresponding to the R, G, and B colors.

In the ASIC 30, the A/D converter 34 converts the analog image signal received from the image reader 12, into the digital image signal, and the image processing portion 36 extracts the resolution confirm signals from the image signal. Based on the thus extracted resolution confirm signals, the CPU 38 judges whether the set resolution has normally been indicated from the waveform producing portion 32 to the image reader 12. If it is judged that the set resolution has normally been indicated to the image reader 12, the image processing portion 36 processes one page of image represented by the image signal at the set resolution. That is, the ASIC 30 confirms the reading resolution at the beginning of reading of each page of image. However, if the resolution represented by the resolution confirm signals is not identical with the set resolution, the ASIC 30 once more confirms the resolution based on the following resolution confirm signals, received from the image reader 12. If another negative judgment is obtained, the ASIC 30 judges that the set resolution has not normally been indicated to the image reader 12, and aborts the current image reading operation.

As is apparent from the foregoing description of the image reading apparatus 10, the resolution change signal producing portion 64 provides a resolution selecting portion. In addition, the waveform producing portion 32 provides a control start signal producing portion and a clock pulse signal outputting portion; the flip flops 42, 44, 46 provide a clock pulse signal producing portion; and the selecting switches 48, 50 provide a clock pulse signal selecting portion.

In each of the illustrated embodiments, as shown in FIG. 5, the clock-pulse signals include the primary clock-pulse signal CLK (1200 dpi) having, as the characteristic portion thereof, the single pulse fall in the second predetermined time duration falling in the first predetermined time duration in which the start signal SP continues to take the ON state, i.e., the high level or voltage, so as to inhibit the image reader 12 from controlling the channel selecting switches 62, and having the single pulse fall in each of consecutive unit times in the third time duration which follows the first or second time duration and in which the start signal continues to take the OFF state, i.e., the low level or voltage, so as to allow the image reader 12 to control the channel selecting switches 62. The length of each unit time in the third time duration is equal to the length of the second time duration. The clock-pulse signals additionally include the three secondary clock-pulse signals CLK (600 dpi, 300 dpi, 150 dpi) having the two, four, and eight pulse falls in the second time duration, respectively, and having the single pulse fall in each of the unit times in the third time duration. The two, four, and eight pulse falls are more than the single pulse fall. The second predetermined time duration is shorter than the first predetermined time duration.

In each of the illustrated embodiments, the primary clock-pulse signal CLK (1200 dpi) is the first periodic signal having the first period in each of the second and third time durations, and the secondary clock-pulse signals CLK (600 dpi, 300 dpi, 150 dpi) are the second periodic signals each having the first period in the second time duration and respectively having the second, third, and fourth periods in the first time duration. The second period is shorter than the first period; the third period is shorter than the second period; and the fourth period is shorter than the third period. The second, third, and fourth periods are obtained by dividing the first period by two, four, and eight, respectively.

In each of the illustrated embodiments, each of the primary clock-pulse signal CLK (1200 dpi) and the secondary clock-pulse signals CLK (600 dpi, 300 dpi, 150 dpi) is produced based on the reference clock as the reference clock-pulse signal. The start signal SP is also produced based on the reference clock.

In the illustrated image reading apparatus 10, the SP and CLK signals to be outputted from the ASIC 30 to the image reader 12 are utilized by the ASIC 30 to indicate the set reading resolution to the image reader 12. Therefore, there is no need to employ an additional signal line for the ASIC 30 to indicate the set resolution to the image reader 12, which leads to decreasing the production cost of the apparatus 10. Moreover, since the set resolution is indicated by utilizing the number of pulse falls of the CLK signal during the second time duration falling in the first time duration in which the SP signal takes the high level or voltage, each one of the multiple degrees or steps of reading resolution can be easily indicated from the ASIC 30 to the image reader 12.

In particular, in the illustrated image reading apparatus 10, the first time duration in which the SP signal takes the high level is unchangeable, and the frequency or period of each CLK signal is changeable to indicate, and select, each one of the multiple steps of reading resolution. Therefore, as compared with the prior image reading apparatus, disclosed by the previously-identified Japanese Patent Publication No. 2000-101803, in which the pulse width of the SP signal is increased, the time duration needed by the image reader 12 before the commencement of each image reading operation can be decreased.

In addition, in the illustrated image reading apparatus 10, if it is judged that the set reading resolution has not normally been indicated from the ASIC 30 to the image reader 12, the current image reading operation is aborted to prevent the image from being read at the erroneous reading resolution. However, even if it may be judged that the resolution represented by one resolution confirm signal produced when one line of the image is read is not identical with the set resolution, the ASIC 30 makes another judgment based on another resolution confirm signal that is produced when the next line of image is read. Therefore, the ASIC 30 can prevent itself from erroneously aborting the current image reading operation, when the resolution represented by one confirmation signal is just temporarily judged to be not identical with the set resolution, because of, e.g., noise.

While the present invention has been described in its preferred embodiment, it is to be understood that the present invention may otherwise be embodied.

For example, in the illustrated image reading apparatus 10, the set reading resolution is indicated by utilizing the number of pulse falls of each CLK signal during the second time duration falling in the first time duration in which the SP signal takes the high voltage. However, it is possible to employ a different manner. For example, the set reading resolution may be indicated by utilizing the number of pulse rises of each CLK signal during the second time duration. Otherwise, the set resolution may be indicated by utilizing a different characteristic portion or portions (e.g., a frequency itself) of the CLK signal than the pulse falls or rises. However, the number of pulse falls or rises is preferable because that number can be determined with a considerably simple electric circuit.

In addition, in the illustrated image reading apparatus 10, the ASIC 30 confirms whether the set reading resolution has normally been indicated to the image reader 12. However, the ASIC 30 may be modified not to carry out the confirmation.

Figure 11:
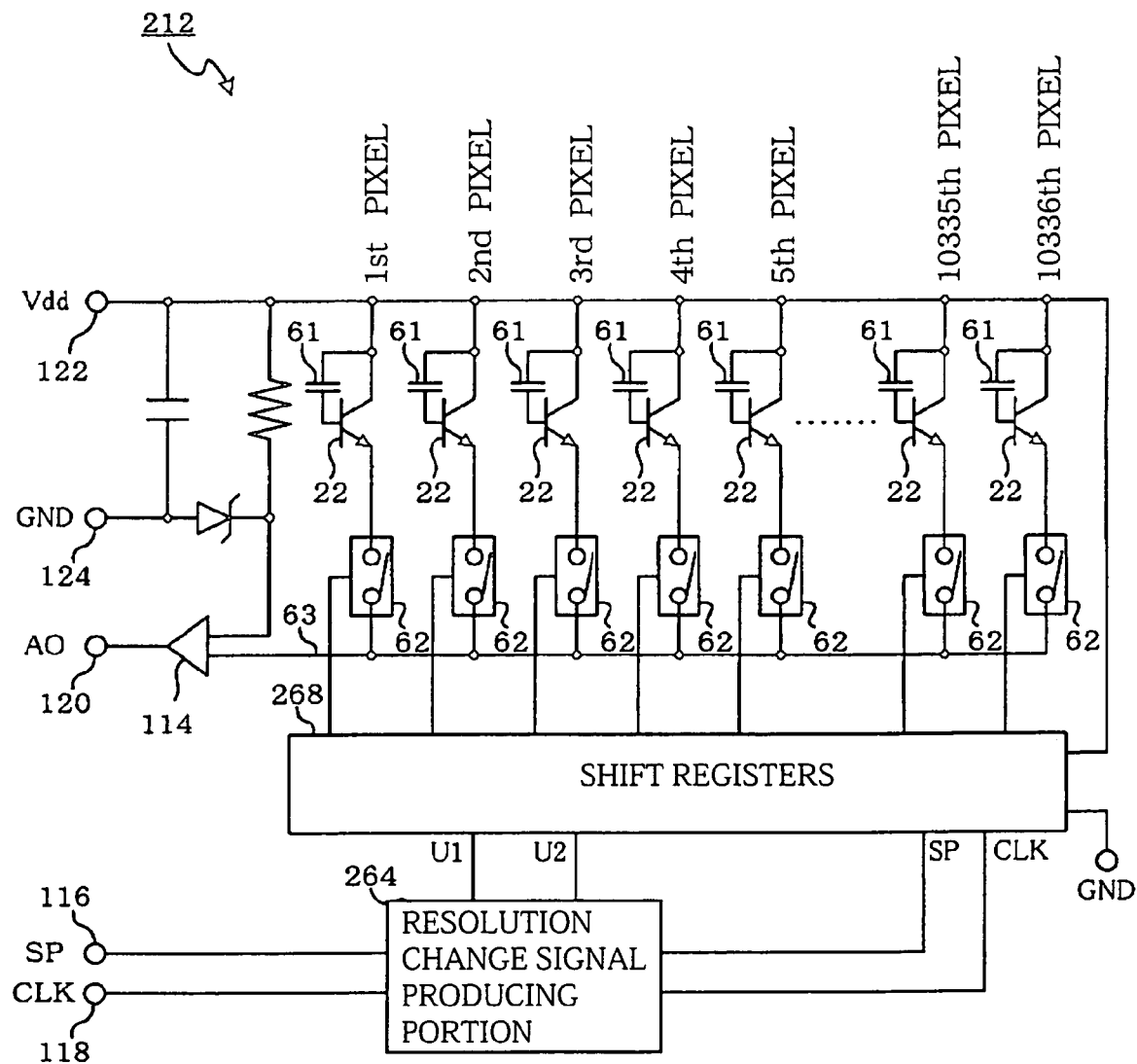
FIG. 11 is a diagrammatic view corresponding to FIG. 6, for explaining an arrangement of an image reader of another image reading apparatus as another embodiment of the present invention.

Here, another image reading apparatus as a second embodiment of the present invention that does not carry out the above confirmation is described by reference to FIGS. 11, 12, and 13. This image reading apparatus employs an image reader 212, shown in FIG. 11, in place of the image reader 12 of the image reading apparatus 10 as the first embodiment. The same reference numerals as used in the image reading apparatus 10 as the first embodiment are used to designate the corresponding elements and parts of the present image reading apparatus as the second embodiment.

The image reader 212 differs from the image reader 12, shown in FIG. 6, in that the image reader 212 does not employ the resolution confirm signal producing portion 66, and employs a resolution change signal producing portion 264 and shift registers 268 in place of the resolution change signal producing portion 64 and the shift registers 68, respectively.

Figure 12:
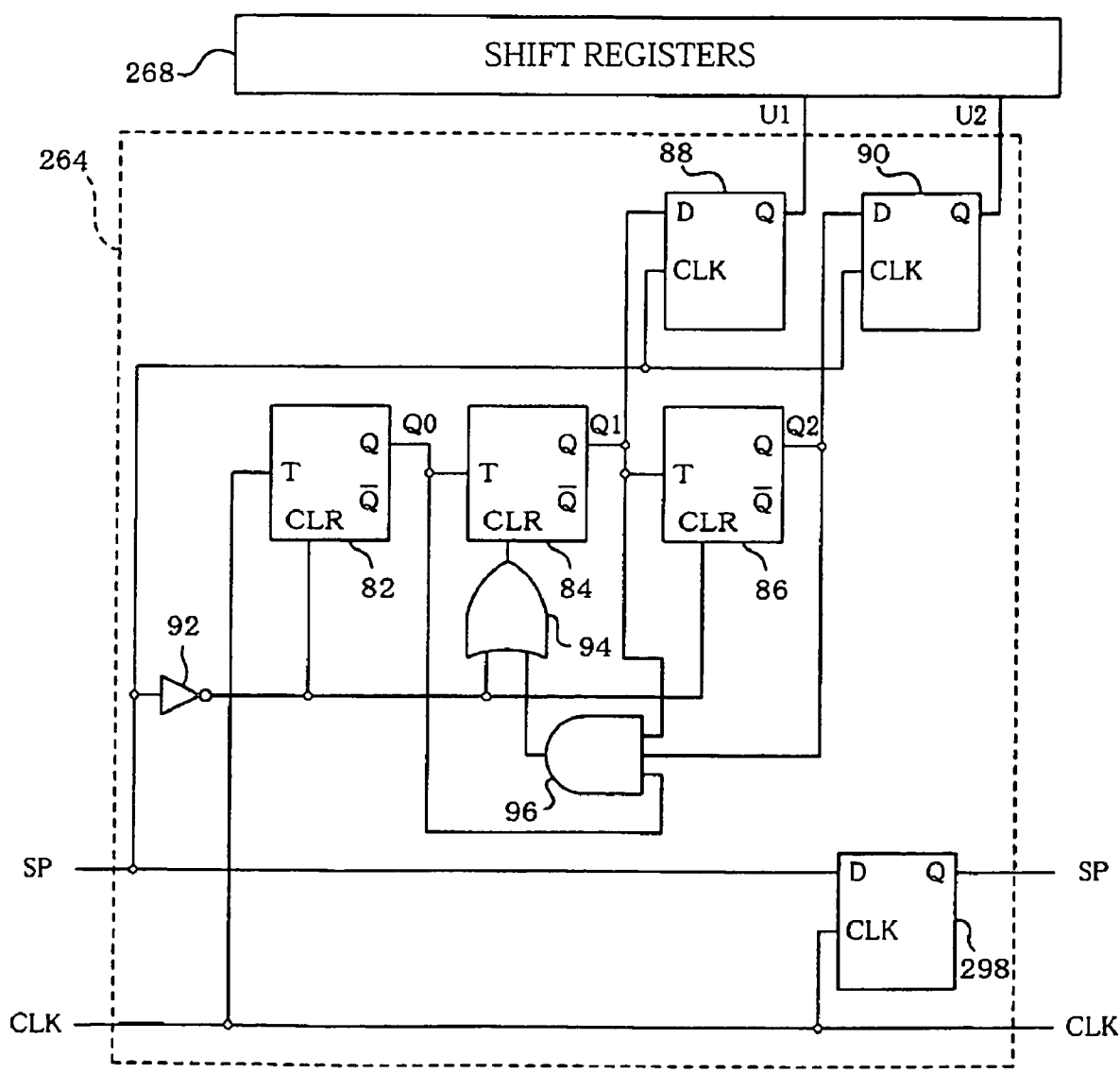
FIG. 12 is a diagrammatic view corresponding to FIG. 7, for explaining an arrangement of a resolution change signal producing portion of the image reading apparatus of FIG. 11.

As shown in FIG. 12, the resolution change signal producing portion 264 differs from the resolution change signal producing portion 64 of the image reading apparatus 10, in that the producing portion 264 additionally employs a D flip flop 298. The flip flop 298 has the same function as that of the flip flop 98 as part of the resolution confirm signal producing portion 66. That is, at a timing when the CLK signal inputted to an input terminal, CLK, of the flip flop 298 falls, the flip flop 298 outputs, from an output terminal, Q, thereof, an output signal corresponding to the level of the SP signal inputted to an input terminal, D, of the flop flop 298.

Figure 13:
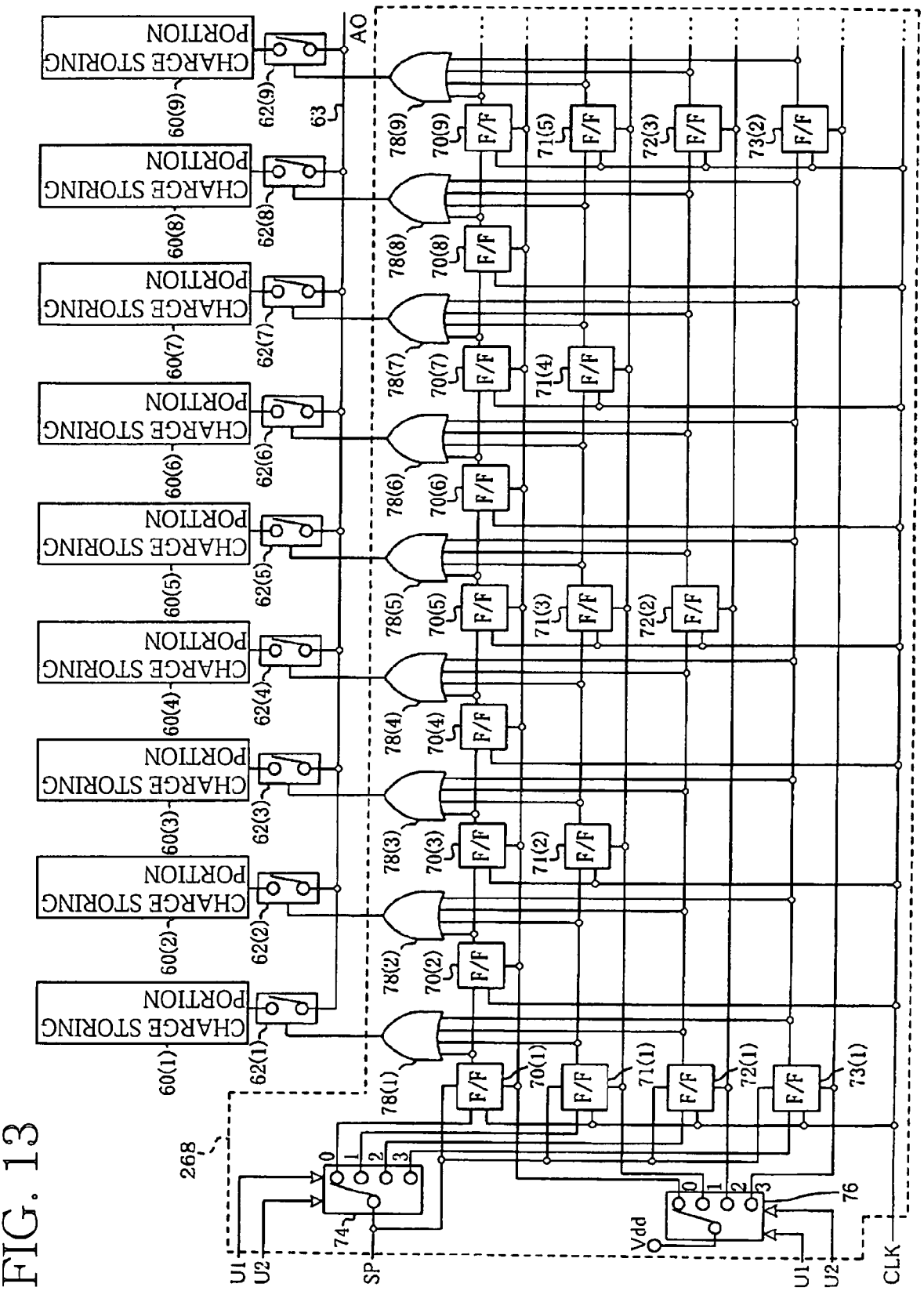
FIG. 13 is a diagrammatic view corresponding to FIG. 9, for explaining an arrangement of shift registers of the image reading apparatus of FIG. 11.

As shown in FIG. 13, the shift registers 268 differ from the shift registers 68 of the image reading apparatus 10, in that the SP signal supplied from the resolution change signal producing portion 264 to the shift registers 268 are additionally inputted to the respective input terminals CLR of the flip flops 70(1), 71(1), 72(1), 73(1).

The image reader 212 is operated, like the image reader 12, such that the resolution change signal producing portion 264 produces resolution change signals U1, U2 corresponding to the number of pulse falls of each CLK signal during the second time duration falling in the first time duration in which the SP signal received from the ASIC 30 takes the high level, and the producing portion 264 outputs the resolution change signals U1, U2 to the shift registers 268. In addition, when each CLK signal falls while the SP signal take the high level, the output signal from the output terminal Q of the flip flop 298 rises up to the high level, so that the input signal inputted to the input terminal D of one of the flip flops 70(1), 71(1), 72(1), 73(1) that corresponds to the resolution change signals U1, U2 rises up to the high level. However, the flip flops 70(1), 71(1), 72(1), 73(1) are kept in respective reset states while the SP signal inputted to the respective input terminals CLR thereof takes the high level, so that the switching elements 62 disconnect the corresponding charge storing portions 60(1) from the output signal line 63.

Then, when the SP signal inputted to the resolution change signal producing portion 264 falls down to the low level, the output signal from the output terminal Q of the flip flop 298 falls down at a timing when each CLK signal next falls down, and simultaneously the output signal from the output terminal Q of one of the flip flops 70(1), 71(1), 72(1), 73(1) that corresponds to the resolution change signals U1, U2 rises up to the high level, so that reading of an image at the set resolution is started.

Since the present image reading apparatus does not confirm whether the reset reading resolution has normally been indicated to the image reader 212, the apparatus does not output any resolution confirm signals. Therefore, the present apparatus can more quickly start reading an image.

It is to be understood that the present invention may be embodied with various changes and improvements that may occur to a person skilled in the art, without departing from the spirit and scope of the invention defined in the appended claims.

What is claimed is:

1. An image reader, comprising:
a plurality of photoelectric transducers each of which converts a light signal received from an image, into an electric signal, and includes an output portion which outputs the electric signal to a signal line common to the photoelectric transducers;

a plurality of channel selecting switches each of which is connected to a corresponding one of the photoelectric transducers and selectively connects, and disconnects, the output portion of said one photoelectric transducer to, and from, the signal line; and a resolution selecting portion which receives, from an external device, (a) a control-start signal which commands the image reader to start controlling the channel selecting switches, and continues to take a predetermined voltage in a first predetermined time duration, and (b) each one of a plurality of clock-pulse signals which have respective different numbers of characteristic portions or portion in a second predetermined time duration falling in the first time duration, and said each of which has a plurality of pulses in a third time duration following the second time duration, the channel selecting switches being sequentially controlled in synchronism with the pulses of said each clock-pulse signal in the third time duration, so as to sequentially connect, and disconnect, the respective output portions of the corresponding photoelectric transducers to, and from, the signal line, the resolution selecting portion selecting, based on the number of characteristic portions or portion of said each clock-pulse signal, a corresponding one of a plurality of different reading resolutions corresponding to a plurality of different control patterns, respectively, so that the channel selecting switches are sequentially controlled according to the control pattern corresponding to the selected reading resolution, in synchronism with the pulses of said each clock-pulse signal in the third time duration.

2. The image reader according to claim 1, wherein the clock-pulse signals comprise a primary clock-pulse signal having a first number of characteristic portions or portion in the second time duration falling in the first time duration in which the control-start signal continues to take a first predetermined voltage as the predetermined voltage, so as to inhibit the image reader from controlling the channel selecting switches, and having the first number of characteristic portions or portion in each of a plurality of unit times in the third time duration in which the control-start signal continues to take a second predetermined voltage, so as to allow the image reader to control the channel selecting switches, a length of said each unit time being equal to a length of the second time duration; and at least one secondary clock-pulse signal having a second number of characteristic portions in the second time duration, and having the first number of characteristic portions or portion in said each unit time in the third time duration, the second number being greater than the first number.

3. The image reader according to claim 2, wherein the primary clock-pulse signal comprises a first periodic signal having a first period in each of the second and third time durations, and said at least one secondary clock-pulse signal comprises at least one second periodic signal having the first period in the second time duration and a second period in the first time duration, the second period being shorter than the first period.

4. The image reader according to claim 3, wherein the second period is obtained by dividing the first period by an integral number.

5. The image reader according to claim 2, wherein each of the primary clock-pulse signal and said at least one secondary clock-pulse signal is produced based on a reference clock-pulse signal.

6. The image reader according to claim 5, wherein the control-start signal is produced based on the reference clock-pulse signal.

7. The image reader according to claim 1, wherein the second predetermined time duration is shorter than the first predetermined time duration.

8. The image reader according to claim 1, further comprising a plurality of shift registers which control, according to the control pattern corresponding to the reading resolution selected by the resolution selecting portion, the channel selecting switches, so that the channel selecting switches sequentially connect, and disconnect, the respective output portions of the corresponding photoelectric transducers to, and from, the signal line.

9. The image reader according to claim 8, wherein the channel selecting switches comprise a plurality of groups of channel selecting switches, and wherein when the resolution selecting portion selects one of the reading resolutions, such that the selected reading resolution is not a highest one of the reading resolutions, the shift registers sequentially control, according to the control pattern corresponding to the selected reading resolution, the groups of channel selecting switches, such that each group of channel selecting switches simultaneously connect, and disconnect, the corresponding photoelectric transducers to, and from, the signal line.

10. The image reader according to claim 1, wherein each time the image reader reads one of a plurality of lines in the image, the resolution selecting portion selects one of the reading resolutions.

11. The image reader according to claim 1, wherein the resolution selecting portion selects said one reading resolution based on a number of pulses or pulse of said each clock-pulse signal that occur or occurs in the second time duration falling in the first time duration in which the control-start signal continues to take the predetermined voltage.

12. The image reader according to claim 1, further comprising a confirmation-signal producing portion which produces a resolution confirmation signal representing the reading resolution selected by the resolution selecting portion, and outputs the resolution confirmation signal to the signal line.

13. The image reader according to claim 12, wherein the confirmation-signal producing portion outputs the resolution confirmation signal to the signal line, before the channel selecting switches are controlled, according to the control pattern corresponding to the selected reading resolution, to sequentially connect, and disconnect, the respective output portions of the corresponding photoelectric transducers to, and from, the signal line.

14. The image reader according to claim 1, wherein in the first time duration in which the control-start signal continues to take the predetermined voltage, the channel selecting switches are not controlled to connect, and disconnect, the respective output portions of the corresponding photoelectric transducers to, and from, the signal line.

15. An image reading apparatus, comprising:
an image reader including
a plurality of photoelectric transducers each of which converts a light signal received from an image, into an electric signal, and includes an output portion which outputs the electric signal to a signal line common to the photoelectric transducers;

a plurality of channel selecting switches each of which is connected to a corresponding one of the photoelectric transducers and selectively connects, and disconnects, the output portion of said one photoelectric transducer to, and from, the signal line; and a resolution selecting portion which receives, from an external device, (a) a control-start signal which commands the image reader to start controlling the channel selecting switches, and continues to take a predetermined voltage in a first predetermined time duration, and (b) each one of a plurality of clock-pulse signals which have respective different numbers of characteristic portions or portion in a second predetermined time duration falling in the first time duration, and said each of which has a plurality of pulses in a third time duration following the second time duration, the channel selecting switches being sequentially controlled in synchronism with the pulses of said each clock-pulse signal in the third time duration, so as to sequentially connect, and disconnect, the respective output portions of the corresponding photoelectric transducers to, and from, the signal line, the resolution selecting portion selecting, based on the number of characteristic portions or portion of said each clock-pulse signal, a corresponding one of a plurality of different reading resolutions corresponding to a plurality of different control patterns, respectively, so that the channel selecting switches are sequentially controlled according to the control pattern corresponding to the selected reading resolution, in synchronism with the pulses of said each clock-pulse signal in the third time duration;

a control-start-signal outputting portion which outputs the control-start signal to the image reader; and a clock-pulse-signal outputting portion which selects, based on each one of the reading resolutions that is to be indicated to the image reader, a corresponding one of the clock-pulse signals, and outputs the selected clock-pulse signal to the image reader.

16. The image reading apparatus according to claim 15, wherein the clock-pulse signals comprise a primary clock-pulse signal having a first number of characteristic portions or portion in the second time duration falling in the first time duration in which the control-start signal continues to take a first predetermined voltage as the predetermined voltage, so as to inhibit the image reader from controlling the channel selecting switches, and having the first number of characteristic portions or portion in each of a plurality of unit times in the third time duration in which the control-start signal continues to take a second predetermined voltage, so as to allow the image reader to control the channel selecting switches, a length of said each unit time being equal to a length of the second time duration; and at least one secondary clock-pulse signal having a second number of characteristic portions in the second time duration, and having the first number of characteristic portions or portion in said each unit time in the third time duration, the second number being greater than the first number.

17. The image reading apparatus according to claim 15, wherein the clock-pulse-signal outputting portion selects, based on a first reading resolution of the reading resolutions that is to be indicated to the image reader, a primary clock-pulse signal of the clock-pulse signals that has a first number of characteristic portions or portion in each of the second time duration in which the control-start signal continues to take a first predetermine voltage as the predetermined voltage, and each of a plurality of unit times in the third time duration in which the control-start signal continues to take a second predetermined voltage, a length of said each unit time being equal to a length of the second time duration, and wherein the clock-pulse-signal outputting portion selects, based on a second reading resolution of the reading resolutions that is to be indicated to the image reader, a secondary clock-pulse signal of the clock-pulse signals that has a second number of characteristic portions in the second time duration, and has the first number of characteristic portions or portion in said each unit time in the third time duration.

18. The image reading apparatus according to claim 15, wherein the clock-pulse-signal outputting portion comprises:

a clock-pulse-signal producing portion which produces the clock-pulse signals having the different numbers of characteristic portions or portion in the second time duration, respectively; and a clock-pulse-signal selecting portion which selects, based on said each reading resolution to be indicated to the image reader, said one clock-pulse signal, and outputs the selected clock-pulse signal to the image reader.

19. The image reading apparatus according to claim 18, wherein the clock-pulse-signal producing portion produces each one of the clock-pulse signals by dividing a frequency of a reference pulse signal by an integral number.

20. A method of setting a reading resolution in an image reader including a plurality of photoelectric transducers each of which converts a light signal received from an image, into an electric signal, and includes an output portion which outputs the electric signal to a signal line common to the photoelectric transducers, and a plurality of channel selecting switches each of which is connected to a corresponding one of the photoelectric transducers and selectively connects, and disconnects, the output portion of a corresponding one of the photoelectric transducers to, and from, the signal line, the method comprising the steps of:

receiving, from an external device, (a) a control-start signal which commands the image reader to start controlling the channel selecting switches, and continues to take a predetermined voltage in a first predetermined time duration, and (b) each one of a plurality of clock-pulse signals which have respective different numbers of characteristic portions or portion in a second predetermined time duration falling in the first time duration, and said each of which has a plurality of pulses in a third time duration following the second time duration, the channel selecting switches being sequentially controlled in synchronism with the pulses of said each clock-pulse signal in the third time duration, so as to sequentially connect, and disconnect, the respective output portions of the corresponding photoelectric transducers to, and from, the signal line, and selecting, based on the number of characteristic portions or portion of said each clock-pulse signal, a corresponding one of a plurality of different reading resolutions corresponding to a plurality of different control patterns, respectively, so that the channel selecting switches are sequentially controlled according to the control pattern corresponding to the selected reading resolution, in synchronism with the pulses of said each clock-pulse signal in the third time duration.

21. The method according to claim 20, wherein the clock-pulse signals comprise a primary clock-pulse signal having a first number of characteristic portions or portion in the second time duration falling in the first time duration in which the control-start signal continues to take a first predetermined voltage as the predetermined voltage, so as to inhibit the image reader from controlling the channel selecting switches, and having the first number of characteristic portions or portion in each of a plurality of unit times in the third time duration in which the control-start signal continues to take a second predetermined voltage, so as to allow the image reader to control the channel selecting switches, a length of said each unit time being equal to a length of the second time duration; and at least one secondary clock-pulse signal having a second number of characteristic portions in the second time duration, and having the first number of characteristic portions or portion in said each unit time in the third time duration, the second number being greater than the first number.

22. The method according to claim 20, wherein the image reader further comprises a plurality of shift registers which control, according to the control pattern corresponding to the reading resolution selected based on said each clock-pulse signal, the channel selecting switches, so that the channel selecting switches sequentially connect, and disconnect, the respective output portions of the corresponding photoelectric transducers to, and from, the signal line.

23. The method according to claim 20, wherein the step of selecting said one reading resolution comprises selecting said one reading resolution based on a number of pulses or pulse of said each clock-pulse signal that occur or occurs in the second time duration in which the control-start signal continues to take the predetermined voltage.

24. The method according to claim 20, wherein the step of selecting said one reading resolution comprises selecting, each time the image reader reads one of a plurality of lines in the image, one of the reading resolutions.

\* \* \* \* \*